US008212949B2

(12) United States Patent
Pelfrey et al.

(10) Patent No.: US 8,212,949 B2
(45) Date of Patent: Jul. 3, 2012

(54) SYSTEM FOR SELECTIVELY REVEALING INDICIA

(75) Inventors: Keith Allen Pelfrey, Wadsworth, OH (US); Jackson W. Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 577 days.

(21) Appl. No.: 12/489,563

(22) Filed: Jun. 23, 2009

(65) Prior Publication Data

US 2010/0064558 A1 Mar. 18, 2010

Related U.S. Application Data

(63) Continuation-in-part of application No. 12/283,672, filed on Sep. 15, 2008.

(51) Int. Cl.
*G02F 1/1335* (2006.01)

(52) U.S. Cl. ........................................ 349/16; 349/17

(58) Field of Classification Search ............... 349/16–17
See application file for complete search history.

(56) References Cited

U.S. PATENT DOCUMENTS

| | | | | |
|---|---|---|---|---|
| 5,825,436 | A * | 10/1998 | Knight | 349/16 |
| 5,884,808 | A | 3/1999 | Muderlak et al. | |
| 6,325,245 | B1 | 12/2001 | Matthews | |
| 6,416,827 | B1 | 7/2002 | Chakrapani et al. | |
| 6,671,008 | B1 | 12/2003 | Li et al. | |
| 6,691,897 | B2 | 2/2004 | Ashe | |
| 6,834,452 | B2 | 12/2004 | Martin et al. | |
| 6,897,936 | B1 | 5/2005 | Li et al. | |
| 6,997,592 | B2 | 2/2006 | Jeon | |
| 7,009,665 | B2 | 3/2006 | Li et al. | |
| 7,299,576 | B2 | 11/2007 | Martin et al. | |
| 7,309,284 | B2 | 12/2007 | Griswold et al. | |
| 2004/0171423 | A1 | 9/2004 | Silva et al. | |
| 2006/0000848 | A1 | 1/2006 | Humphrey | |
| 2007/0241120 | A1 | 10/2007 | Henry | |
| 2009/0219131 | A1 | 9/2009 | Barnett et al. | |

* cited by examiner

*Primary Examiner* — Nathanael R Briggs
(74) *Attorney, Agent, or Firm* — Renner, Kenner, Greive, Bobak, Taylor & Weber

(57) ABSTRACT

A system for selectively revealing indicia includes a transitioning assembly that is configured to be retrofit with an existing dispenser. The transitioning assembly includes a transitioning window that is coupled to a switch that is configured to be mounted in operative contact with an actuator provided by the dispenser. Upon the engagement of the actuator, the switch is triggered, resulting in the transitioning window transitioning from an at least partially opaque state to an at least partially transparent state, so as to reveal indicia therebehind to an observer.

20 Claims, 16 Drawing Sheets

FIG−17

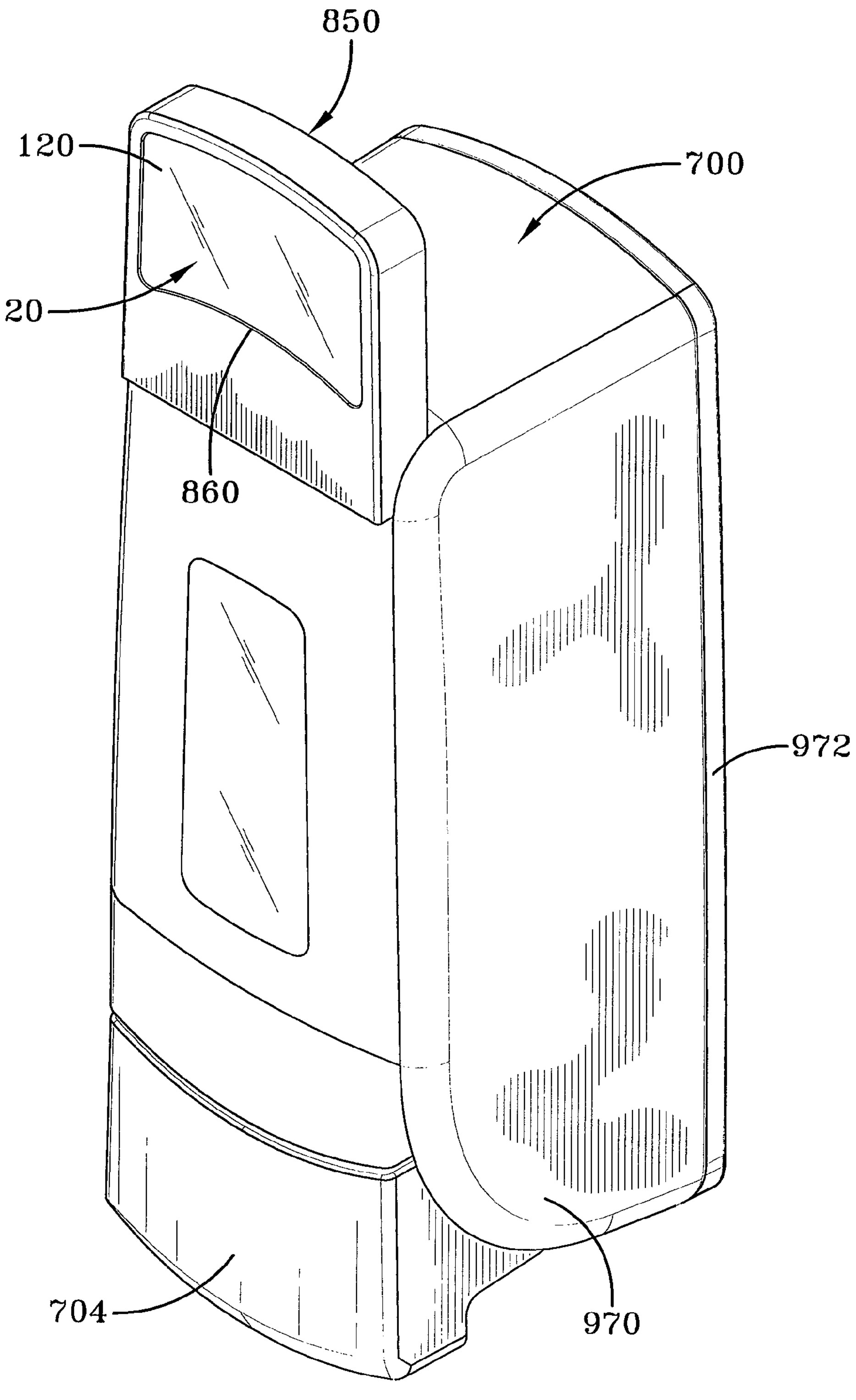
FIG−19

SYSTEM FOR SELECTIVELY REVEALING INDICIA

CROSS-REFERENCE TO RELATED APPLICATION

The instant application is a continuation-in-part of U.S. patent application Ser. No. 12/283,672 filed on Sep. 15, 2008, which is also incorporated herein by reference.

TECHNICAL FIELD

Generally, the present invention relates to a system to selectively reveal removable indicia. In particular, the present invention is directed to a transitioning liquid crystal (LC) window to selectively reveal removable indicia. More particularly, the present invention is directed to a transitioning assembly that includes a transitioning window that can be readily retrofit with an existing dispenser.

BACKGROUND ART

Advertisements, displays, and other informational signage or content have achieved a level of ubiquity in our environment that over time, the population has become very adept at blocking out or otherwise ignoring the information or message conveyed therefrom. To overcome this obstacle in an effort to attract an individual's attention, advertisement campaigns are painstakingly designed and employ a variety of techniques to present information in a compelling manner and to appeal to the interests and senses of the target individual. Thus, to a large degree, the success of a particular advertising or marketing effort to communicate its message to potential consumers is heavily reliant on the medium chosen. However, the cost and expense of developing and producing a marketing campaign with the requisite appeal needed to gain a consumer's interest is significant. Additionally, an advertising campaign that utilizes moving, dynamic images or content to attract the attention of a target individual is costly, as it requires a significant amount of production effort to implement such a concept.

In addition to the cost of producing dynamic informational content, the cost of display units, such as flat screen displays upon which the content is presented, as well as the costs associated with operating such displays, are also significant expenses, thus restricting the total number of locations where such displays will ultimately be installed. In addition, continuously updating the dynamic content presented on such displays is costly and time consuming as well. As such, there are significant costs associated with installing and maintaining a display capable of rendering dynamic informational content. In contrast, informational content that is static or fixed, such as printed content embodied in posters, billboards, and magazines, is much less costly to produce than that of dynamic content but is generally less effective in attracting the interest and attention of a target individual.

In addition, many display units utilize a mains power source, such as an electrical outlet, in order to power the unit. However, because access to mains power sources are relatively limited, it is difficult for providers of the display units to locate them in areas of high-traffic or in areas with other desirable attributes. Moreover, because of the lack of a sufficient number of mains power sources, a sufficient amount of display units may not be able to be placed. As a result, display unit providers are not able to attract the desired level of attention from the indicia displayed by the display unit.

Therefore, there is a need for a transitioning assembly that provides a lock assembly that restricts access to indicia to only authorized individuals. Additionally, there is a need for a transitioning assembly that is capable of being readily retrofit to an existing dispenser. Furthermore, there is a need for a transitioning assembly that can be powered by a portable power source or by a self-sufficient power generation system.

Therefore, there is a need for a low-cost, low-power system for selectively revealing indicia, such as a static printed image via a transitioning window, which transitions between substantially opaque and substantially transparent states to capture an individual's attention. Additionally, there is a need for a system for selectively revealing indicia that utilizes a transitioning window in connection with indicia that can be removably replaced as desired. Furthermore, there is a need for a system for selectively revealing indicia that utilizes a transitioning window in connection with a dispenser or any other suitable structure.

SUMMARY OF INVENTION

In light of the foregoing, it is a first aspect of the present invention to provide a dispenser to selectively reveal indicia to an observer comprising an actuator operatively engaged to a power generation unit that generates electrical power from the movement of said actuator; a transitioning window coupled to said power generation unit having a receiving surface and a viewing surface, said window configured to transition between an at least partially opaque state and an at least partially transparent state; and an indicia holder configured to retain the indicia in optical communication with said receiving surface, wherein upon the actuation of said actuator, said power generation unit energizes said transitioning window to transition from said at least partially opaque state to said at least partially transparent state to permit the observer to view the indicia via said viewing surface.

It is another aspect of the present invention to provide a dispenser to selectively reveal indicia to an observer comprising an actuator in operative communication with a power generation unit that generates electrical power from the movement of said actuator; a transitioning window having a receiving surface and a viewing surface, said window configured to transition between an at least partially transparent state and an at least partially opaque state; a switch coupled to said transitioning window and in operative engagement with said actuator; a portable power source coupled between said power generation unit and said switch; and an indicia holder configured to retain the indicia in optical communication with said receiving surface; wherein upon the actuation of said actuator, said power generation unit charges said portable power source, and toggles said switch from an off state to an on state, such that said portable power source energizes said transitioning window to transition from said at least partially opaque state to said at least partially transparent state to permit the observer to view the indicia via said viewing surface.

It is a further aspect of the present invention is to provide a system for selectively revealing indicia to an observer, the system adapted to be attached to a dispenser with at least one attachment aperture, the system comprising a housing that includes a transitioning window having a receiving surface opposite a viewing surface, said transitioning window configured to transition between an at least partially transparent state and an at least partially opaque state, said housing maintaining at least one mounting tab receivable within the at least one attachment aperture; a controller coupled to said transitioning window; a switch coupled to said controller, said switch adapted to be attached to the dispenser, so as to be engaged by said actuator; and a pivoting door attached to said housing, said pivoting door maintaining an indicia holder to retain the indicia therein, such that when said pivoting door is closed, the indicia is adjacent to said receiving surface, wherein upon the actuation of said actuator, said switch is toggled from an off state to an on state to transition said transitioning window from said at least partially opaque state to said at least partially transparent state to permit an observer to view the indicia via said viewing surface.

Yet another aspect of the present invention is to provide a system for selectively revealing indicia to an observer, the system configured to be attached to a dispenser having at least one attachment aperture, the system comprising a housing that includes a transitioning window having a receiving surface opposite a viewing surface, said transitioning window configured to transition between an at least partially transparent state and an at least partially opaque state, said housing maintaining at least one attachment tab receivable within the at least one attachment aperture; a power generation unit coupled to said transitioning window, said power generation unit adapted to be attached to the dispenser, so as to be engaged by said actuator; and a pivoting door attached to said housing, said pivoting door maintaining an indicia holder to retain the indicia therein, such that when said pivoting door is closed the indicia is adjacent to said receiving surface, wherein upon the actuation of said actuator, said power generation unit supplies power to said transitioning window to toggle it from the at least partially opaque state to the at least partially transparent state to permit an observer to view the indicia via said viewing surface.

BRIEF DESCRIPTION OF THE DRAWINGS

These and other features and advantages of the present invention will become better understood with regard to the following description, appended claims, and accompanying drawings wherein:

FIG. 19 is a perspective view of the front of the dispenser that is fully retrofit with the transitioning assembly in accordance with the concepts of the present invention.

BEST MODE FOR CARRYING OUT THE INVENTION

Figure 1:
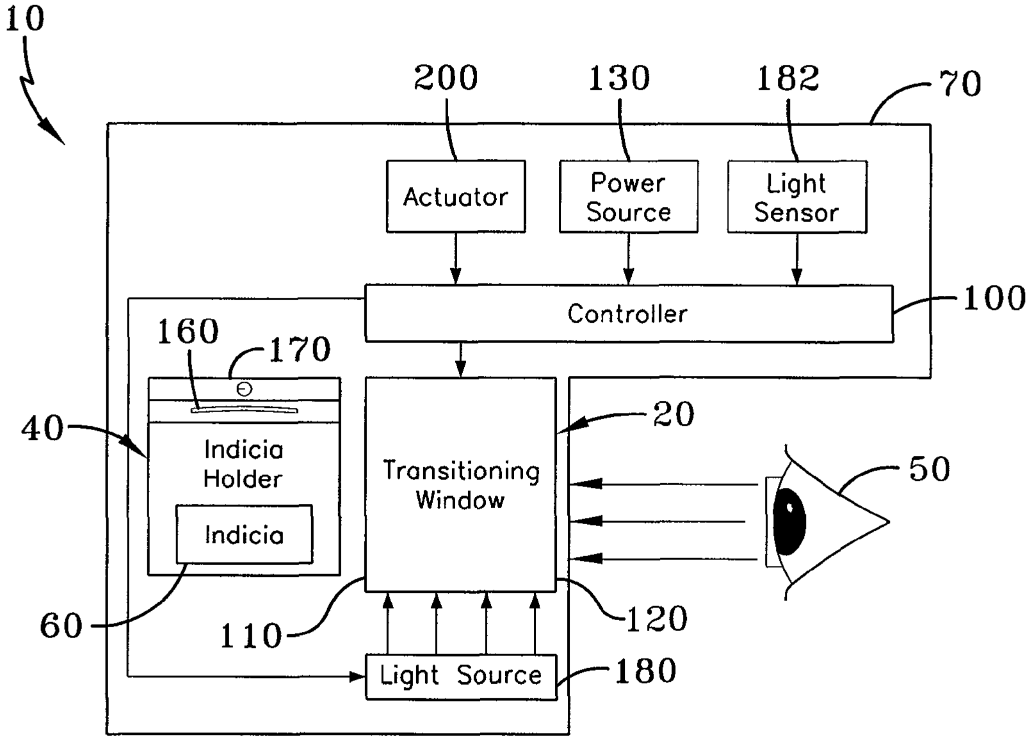
FIG. 1 is a block diagram of a system for selectively revealing indicia in accordance with the concepts of the present invention.
Figure 2:
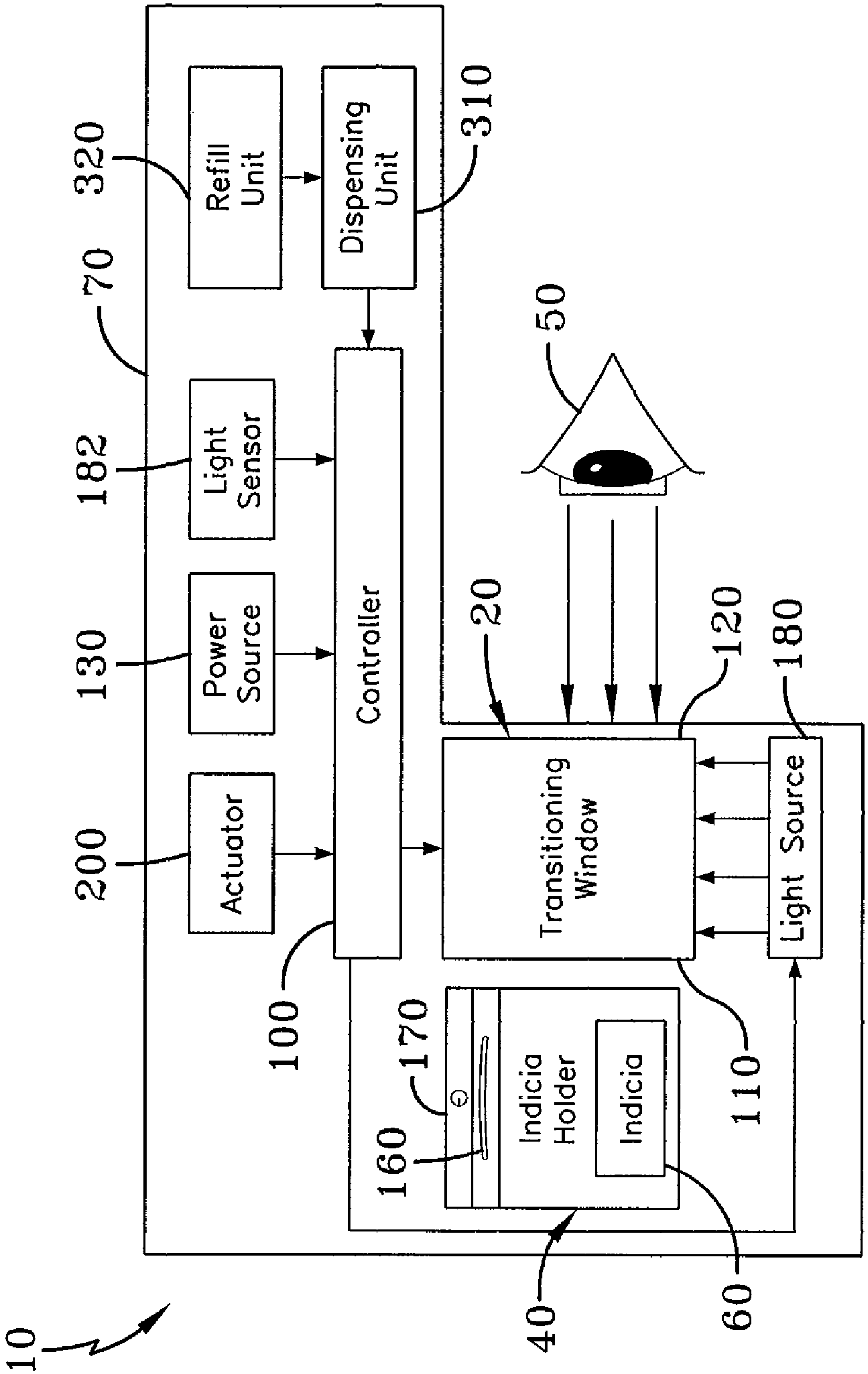
FIG. 2 is a block diagram of the system for selectively revealing indicia when configured for use with a dispenser in accordance with the concepts of the present invention.

A system for selectively revealing indicia is generally referred to by the numeral 10, as shown in FIGS. 1-2. In particular, the system 10 includes a transitioning window 20, such as a polymer dispersed liquid crystal window, which is configured to selectively transition from a substantially, or at least partially, opaque state to a substantially, or at least partially, transparent state. Thus, the use of the terms "opaque state" and "transparent state" as used in the following discussion contemplate opaque and transparent states that are substantially, or at least partially, opaque and substantially, or at least partially, transparent. Continuing, the transitioning window 20 is maintained by the system 10, so that it separates an indicia holder 40 from the line of sight or field of view of an observer 50. As such, the indicia holder 40 is configured to removably retain indicia 60, such as a printed advertisement or other informational content. For the purposes of the following discussion, the term "indicia" is defined as any information, communication, advertisement, image, message, or the like. For example, the indicia 60 may comprise printed characters on a section of paper. Thus, during operation of the system 10, the observer 50 is permitted to view the indicia 60 when the window 20 transitions from the opaque state to the transparent state. The transition between opaque and transparent states may be controlled in accordance with various criteria, such as the input from various stimuli, including the actuation of a switch or via a proximity detector that is configured to detect the presence of a person or the person's hands. As such, the system 10 allows the message or informational content to be conveyed by the indicia 60 in a manner that captures the attention of the observer 50, thus enhancing the effect of informational content provided by the indicia 60. Furthermore, the indicia holder 40 permits a user to quickly and readily change the indicia 60, thereby allowing the informational content conveyed thereby to be updated in a quick and simple manner. While it is understood that a continuum exists between the substantially transparent state, the partially transparent state, the partially opaque state, and the substantially opaque state provided by the transitioning window 20, it should be appreciated that in general, the observer 50 will more clearly view the indicia 60 when the transitioning window 20 is in a transparent state than when the transitioning window is in an opaque state.

Specifically, the system 10 is carried or otherwise disposed within a housing 70 that may be configured to be integral with or otherwise associated with any desired structure, including, but not limited to, a dispenser, a fixture, or an appliance. For example, the housing 70 may be formed, so as to be integral with a soap dispenser, a towel dispenser, a spray mister, a toilet, or a urinal. Alternatively, it should be appreciated that the housing 70 may be formed as a stand-alone device that may be mounted in any desired location. Continuing, the housing 70 maintains a controller 100 that comprises any suitable general-purpose or application-specific computing device for carrying out the functions to be discussed. In one aspect, the controller 100 may maintain non-volatile memory, volatile memory, or a combination of both to facilitate the operation of the system 10. Furthermore, it should be appreciated that the housing 70 may be formed of any suitable material, such as plastic, steel, or aluminum for example, and may be of any suitable size or shape.

Electrically coupled to the controller 100 is the transitioning window 20, which is configured to selectively transition from a substantially transparent state to a substantially opaque state and vice versa. The transitioning window 20 maintains a receiving surface 110 opposite a viewing surface 120, and although the transitioning window 20 may be configured such that the surfaces 110 and 120 oppose each other, other configurations are also contemplated, whereby the surfaces 110 and 120 may be oriented in any desired angle or position with regard to one another. Moreover, the opposed surfaces 110 and 120 may be dimensioned to take on any desired shape, size, or contour. The transitioning window 20 comprises a window formed of polymer dispersed liquid crystals (PDLC) or may be comprised as a suspended particle device (SPD). However, it is also contemplated that the transitioning window 20 may comprise an electrochromic device, as well as any other device which may be controlled, so as to transition from an opaque or substantially opaque state to a transparent or substantially transparent state.

Coupled to the controller 100 is a power source 130 that is configured to power the components of the system 10. The power source 130 may comprise a portable D.C. (direct current) power source, such as a battery, or may be configured to receive and convert power from an A.C. (alternating current) mains power source, such as 120 VAC (alternating current), into a format compatible for operating the system 10. It is also contemplated that the power source 130 may comprise a solar or photovoltaic power source or any other source of power. It should also be appreciated that the power source 130 may comprise a combination of portable power and solar and/or mains power or any other suitable power source. In addition, the power source 130 may solely power the system 10 or in other embodiments may power both the system 10, as well as other aspects of the structure with which the system 10 is integrated. For example, the system 10 may be made integral with a hands-free dispenser configured to dispense a fluid, which are both powered by the power source 130. Furthermore, due to the reduced power requirements of the transitioning window 20, extended operation of the system 10 is permitted when batteries or other portable power source is used.

Maintained adjacent to the receiving surface 110 is the indicia holder 40 that is configured to removably retain indicia 60 in optical alignment with the transitioning window 20, so that it can be selectively revealed to the observer 50 via the viewing surface 120 when the transitioning window 20 is in a transparent or substantially transparent state. While the indicia holder 40 is discussed as being adjacent the receiving surface 110, it should be appreciated that the indicia holder 40 may be oriented in any desired position with respect to the receiving surface 110 as long as it is in optical communication therewith. For example, the indicia holder 40 may be remotely located from the receiving surface 110, while the image from the indicia 60 is routed to the receiving surface 110 via mirrors or any other suitable means.

Continuing, the indicia holder 40 may comprise any suitable device capable of holding, supporting, carrying or otherwise maintaining the indicia 60 in place, while in other embodiments, still permitting the indicia 60 to be removed and replaced. As such, the indicia holder 40 allows the user maintaining the system 10 to readily customize and/or update the content provided by the indicia 60. However in certain embodiments, it is foreseen that the indicia 60 may be permanently mounted or placed in the indicia holder 40.

In one aspect, the system 10 may be configured with an access port 160 within the housing 70, such as a slot for example, that allows an individual to directly access the indicia 60 to thereby remove or replace it as desired. It is also contemplated that access to the indicia holder 40, via the access port 160, may be restricted to only authorized individuals via a locking device 170. The locking device 170 may comprise a locking door or any other suitable device that prevents one from removing and/or inserting indicia into the indicia holder 40 without the appropriate authorization.

The indicia 60 may comprise any suitable material that is permitted to be held in place by the indicia holder 40 or that is permitted to be placed in optical communication with the receiving surface 110 of the transitioning window 20. In one aspect, the indicia 60 may comprise an advertisement, signage, text/graphic content, as well as any other informational content. For example, the indicia 60 may be disposed upon a paper or cardboard section, or upon any other suitable material, which is dimensioned to be received and retained by the indicia holder 40. Thus, when the system 10 is used in association with a soap dispenser, the indicia 60 may provide information that encourages the washing of the user's hands.

Figure 1A:
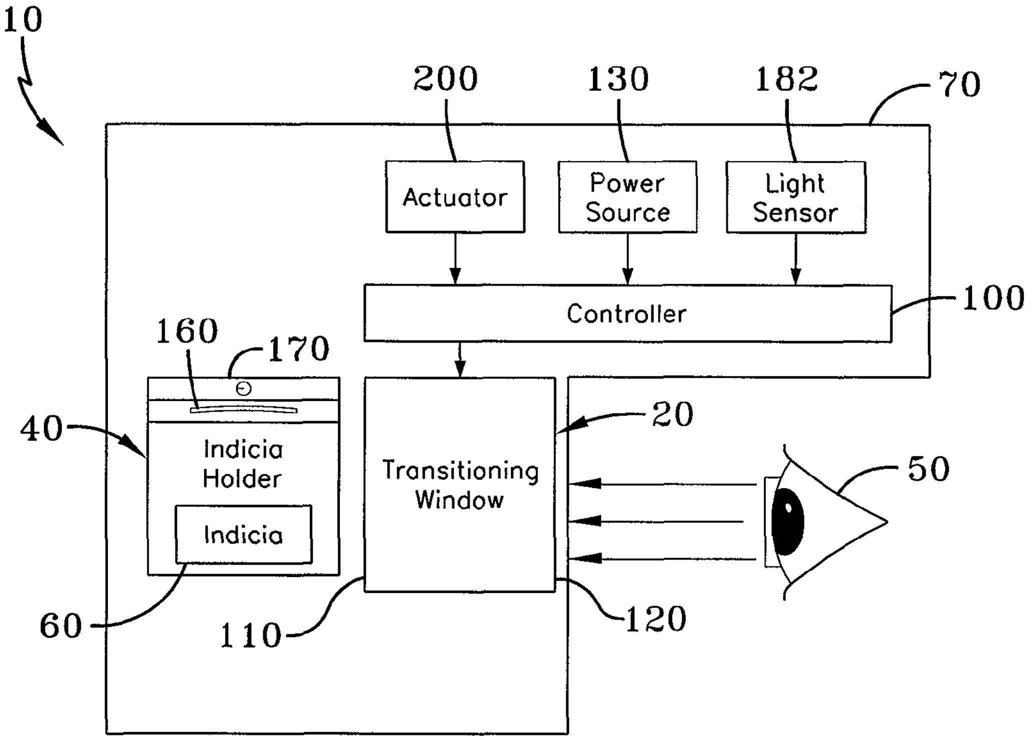
FIG. 1A is a block diagram of the system for selectively revealing indicia that does not utilize a light source in accordance with the concepts of the present invention.

It is also contemplated that in certain embodiments, the indicia 60 may be illuminated by any suitable illumination source. For example, the indicia 60 may be illuminated by a light source 180 that is configured to operatively communicate light with the transitioning window 20. As such, light emitted from the light source 180 may be directed to one or more edges of the transitioning window 20 via a light pipe, optical fiber, or other suitable light routing means. By supplying the light to the edge of the window 20, the light will be carried through the transitioning window 20, so as to illuminate the indicia 60. Such operation serves to further draw the attention of the observer 50 to the indicia 60. It is also contemplated that the light source 180 may be activated based on the change in the ambient light surrounding the system 10 as detected by a light sensor 182 coupled to the controller 100. Alternatively, the system 10 may be configured without the light source 180, as shown in FIG. 1A, while still allowing the observer 50 to view the indicia 60 using the environmental ambient light surrounding the system 10.

The transition of the transitioning window 20 between opaque and transparent states is controlled by an actuator 200, which is coupled to the controller 100. The actuator 200 may comprise a button, a switch, or other device, such as a proximity sensor, that when actuated or otherwise in receipt of suitable stimuli, results in the controller 100 activating the transitioning window 20, so as to transition from a substantially opaque state to a substantially transparent state to permit the display of the indicia 60 to the observer 50. For example, in the case where the actuator 200 comprises a proximity sensor that is capable of detecting the presence or non-presence of one or more individuals, the controller 100 initiates the change in state at the window 20 from opaque to transparent when an individual is in the proximity of the actuator 200 and correspondingly initiates the change in state from transparent to opaque when the individual is no longer in the proximity of the actuator 200.

In another aspect, the system 10 may be configured such that when the transitioning window 20 has transitioned to a transparent or substantially transparent state, a timer maintained by the controller 100 is initiated. After a predetermined amount of time, such as 5 seconds, has expired, the controller 100 transitions the transitioning window 20 back to an opaque or substantially opaque state, thereby blocking or obscuring the indicia 60 from the view of the observer 50. In addition, it should be appreciated that other schemes or protocols for controlling the transition of the transitioning window 20 between opaque and transparent states may be utilized by the system 10, and thus those disclosed herein should not be construed as limiting.

For example, the system 10 or other system, such as a hands-free dispensing system controlling the operation of the system 10, may be configured whereby the transitioning window 20 is placed in a transparent or substantially transparent state to display the indicia 60 when a user initiates the washing of his or her hands upon the dispensing of soap. Once the soap is dispensed, the system 10, or other system associated therewith, identifies when a sufficient amount of time, such as the time period established by the Center for Disease Control (CDC), has expired that coincides with sufficient cleaning of one's hands. Once the time period has expired, the transitioning window 20 then transitions to an opaque state, so as to indicate that it is time to rinse the soap from the user's hands. In one aspect, the indicia 60 associated with such timed process may display informational content to alert the individual of the timed process being implemented.

Thus, with the general components of the system 10 set forth, the following discussion will be directed to specific embodiments that employ the operational features previously discussed.

Figure 3B:
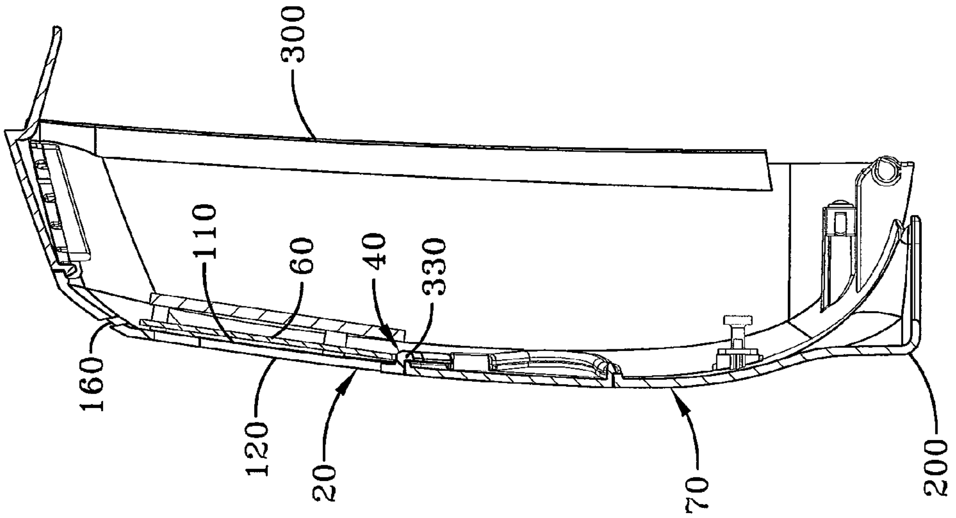
FIG. 3B is a side elevational view of the system for selectively revealing indicia shown in FIG. 3A in accordance with the concepts of the present invention.
Figure 3A:
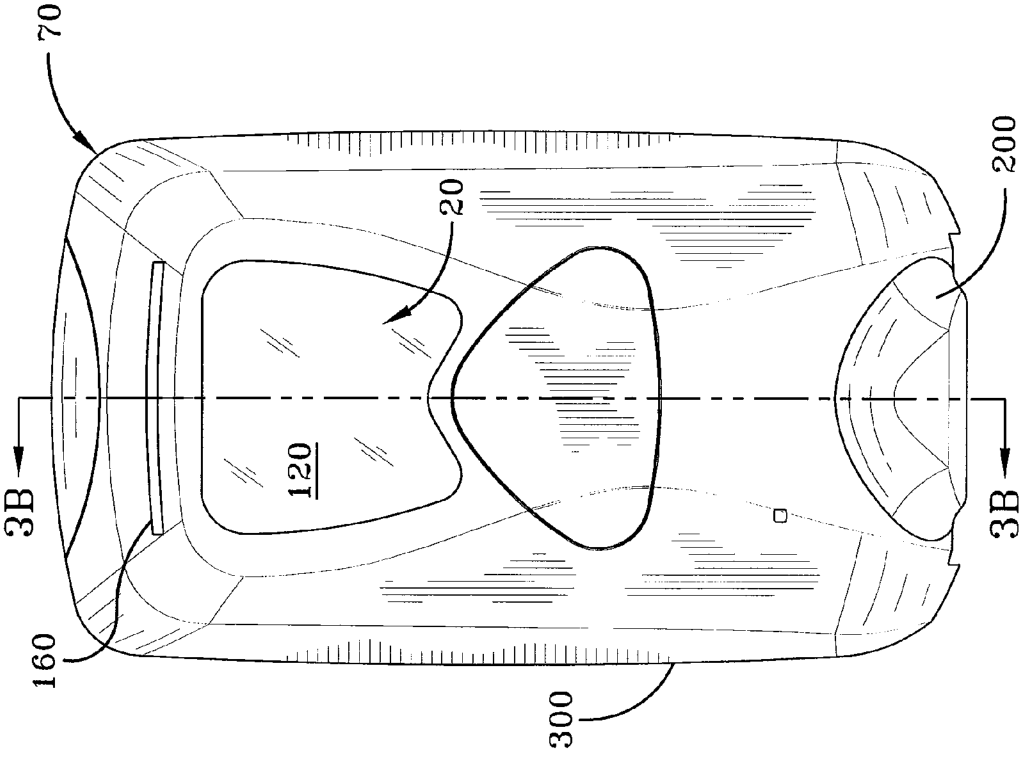
FIG. 3A is a front elevational view of the system for selectively revealing indicia embodied as a fluid dispenser, whereby the transitioning window is substantially opaque so as to obscure the indicia disposed therebehind, in accordance with the concepts of the present invention.
Figure 3C:
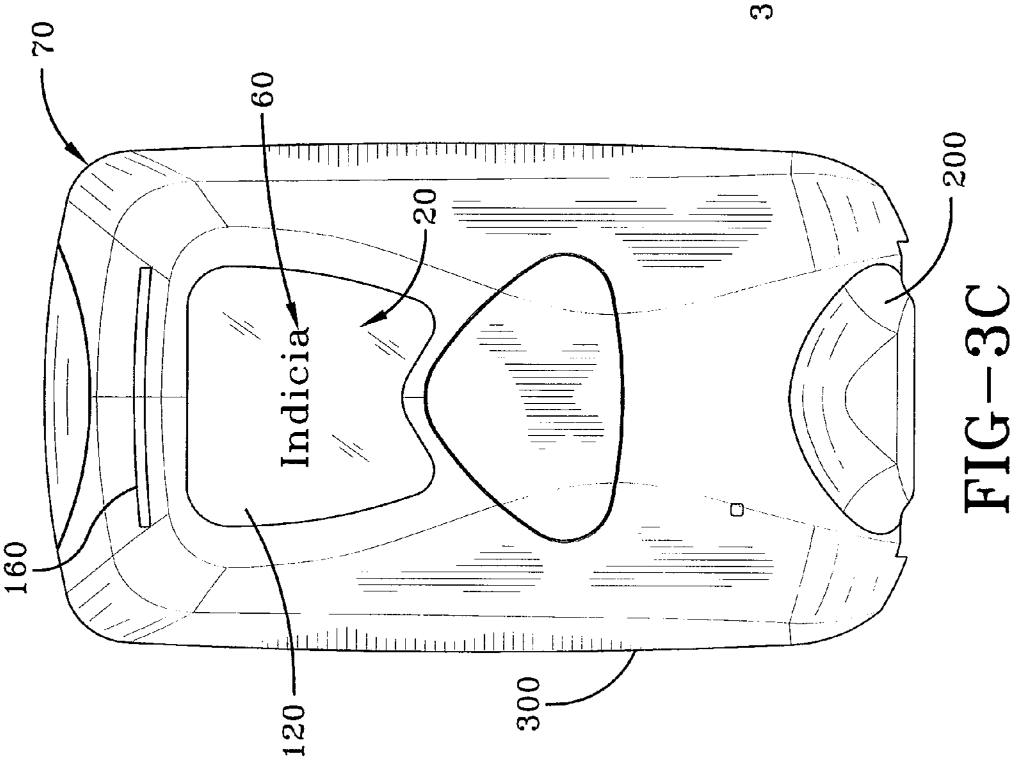
FIG. 3C is a front elevational view of the system for selectively revealing indicia embodied as a fluid dispenser, whereby the transitioning window is substantially transparent so as to permit the display of the indicia therethrough, in accordance with the concepts of the present invention.

An embodiment of the system 10, whereby the housing 70 comprises a dispenser 300, is shown in FIGS. 2 and 3A-C. The dispenser 300 is configured to dispense liquids, such as soap for example, such that upon the actuation of the actuator 200, a dispensing unit 310, such as a pump, is energized to dispense a quantity of material or the dispensing of an item, such as soap, provided by a refill unit or container 320 maintained in operative communication therewith. Coinciding with the actuation of the actuator 200, the transitioning window 20 transitions from a substantially opaque state, as shown in FIG. 3A, to a transparent state, as shown in FIG. 3C, so as to display the indicia 60 for a predetermined period of time or until the actuator 200 detects some other change in condition, such as the movement of the individual away from the proximity of the actuator 200. It should be appreciated that, as shown in FIG. 3B, the indicia holder 40 may comprise a ledge 330 upon which the indicia 60 is permitted to rest. Furthermore, while the dispenser 300 is presented as a liquid dispenser, it should be appreciated that it may be readily adapted to dispense any desired material.

Figure 4:
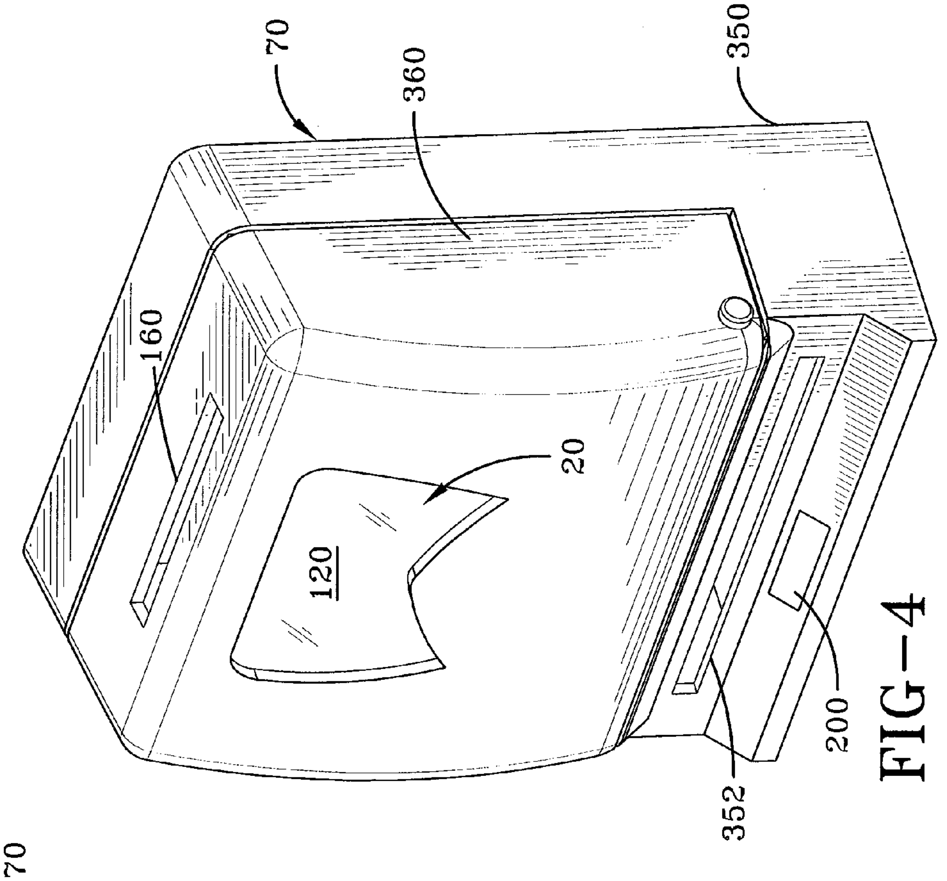
FIG. 4 is a perspective view of the system for selectively revealing indicia when embodied as a towel dispenser in accordance with the concepts of the present invention.

In an alternative embodiment, the housing 70 maintaining the system 10 may comprise a towel dispenser 350, as shown in FIG. 4. The towel dispenser 350 maintains a dispensing slot 352 configured to provide a towel to the individual upon actuation of the actuator 200. Thus, the transitioning window 20 is configured to transition from a substantially opaque state to a substantially transparent state when the actuator 200 is activated. Furthermore, the towel dispenser 350 may have a door 360 that can be opened to access the indicia holder 40 and indicia 60 disposed therein, so that the indicia 60 can be updated or replaced as desired, or the indicia 60 may be accessed via the access port 160. Furthermore, the door 360 may be configured with the locking mechanism, so that access to the indicia 40 is restricted. Or alternatively, the indicia 60 may be inserted or removed from the indicia holder 40 via the access port 160, as previously discussed.

Figure 5:
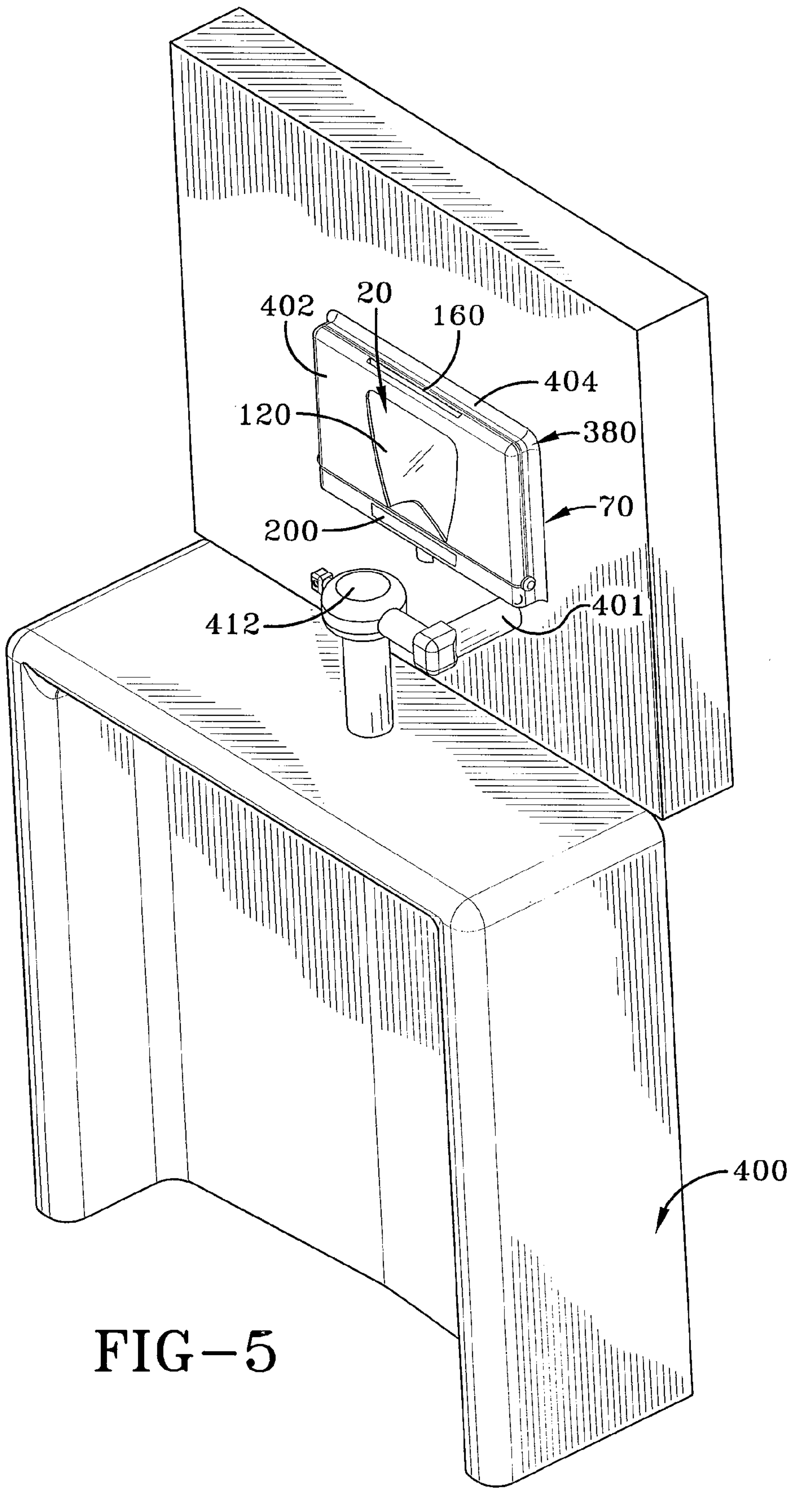
FIG. 5 is a perspective view of the system for selectively revealing indicia when utilized as a stand-alone device in association with a urinal in accordance with the concepts of the present invention.

In yet another embodiment, the system 10 may be configured, so that the housing 70 maintaining the actuator 200 is formed as a stand-alone unit 380, as shown in FIG. 5. In one aspect, the stand-alone unit 380 may be configured, so that it may be operatively interfaced with the power source used to activate an automatic toilet or urinal 400 or other device. For example, the system 10 may be configured such that a power line 401 is coupled between the power source supplied at a flush actuator 412 maintained by the automatic toilet or urinal 400 and the controller 100 maintained by the system 10. As such, the system 10 may be energized directly by the power used to power the automatic toilet or urinal 400, without the need of batteries or other portable power source 130. However, it should be appreciated that the stand-alone unit 380 may be powered by a portable power source, such as battery, or any other suitable power source, thus allowing the unit 380 to be placed in any desired position. Furthermore, the housing 70 of the stand-alone unit 380 comprises a pivoting door 402 that that is attached to a mounting section 404. The pivoting door 402 can be selectively opened to access the indicia holder 40, as well as the indicia 60. Thus, in the event the indicia 60 are to be updated, the door 402 can be readily opened to enable the change of indicia 60. The mounting section 404 facilitates the mounting of the system 10 upon any desired surface or structure using suitable fasteners, such as screws or adhesive for example. In addition, the pivoting door 402 may provide the access port 160, thus facilitating the removal and insertion of new indicia within the housing 70.

Figure 6:
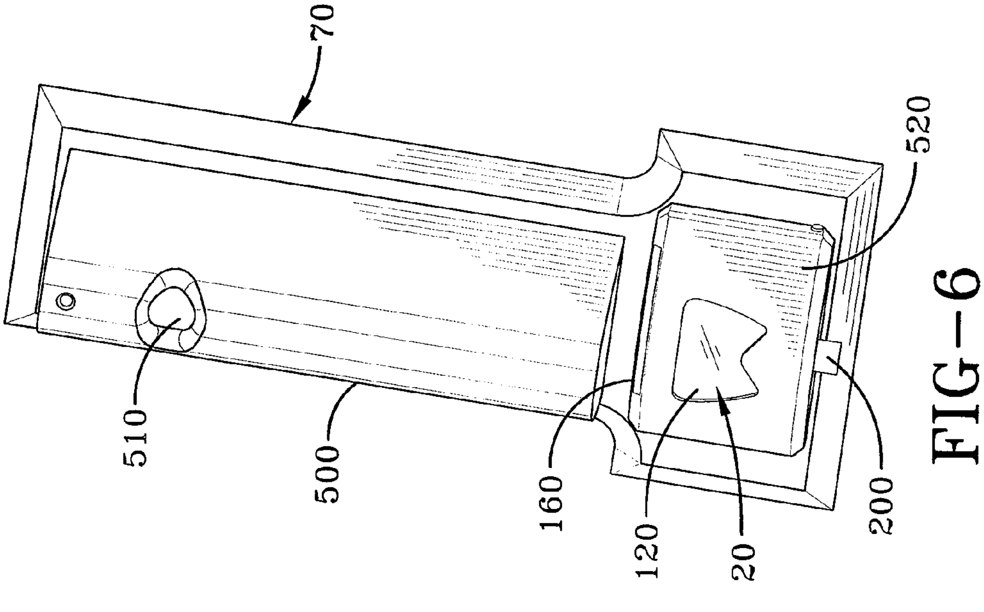
FIG. 6 is a perspective view of the system for selectively revealing indicia when utilized in association with a spray mister in accordance with the concepts of the present invention.

In another embodiment, as shown in FIG. 6, the system 10 may be configured whereby the housing 70 maintaining the system 10 comprises a spray mister 500. In one aspect, the spray mister 500 may be configured to dispense aerosolized material into the air to provide a pleasant scent via a dispensing port 510. As such, the transitioning window 20 may be configured to transition from a substantially opaque state to a substantially transparent state when an individual is within the proximity of the spray mister 500, as detected by the actuator 200. The spray mister 500 may also be configured such that the indicia 60 may be accessed through a pivoting door 520 or via the access port 160 disposed therein.

Figure 7:
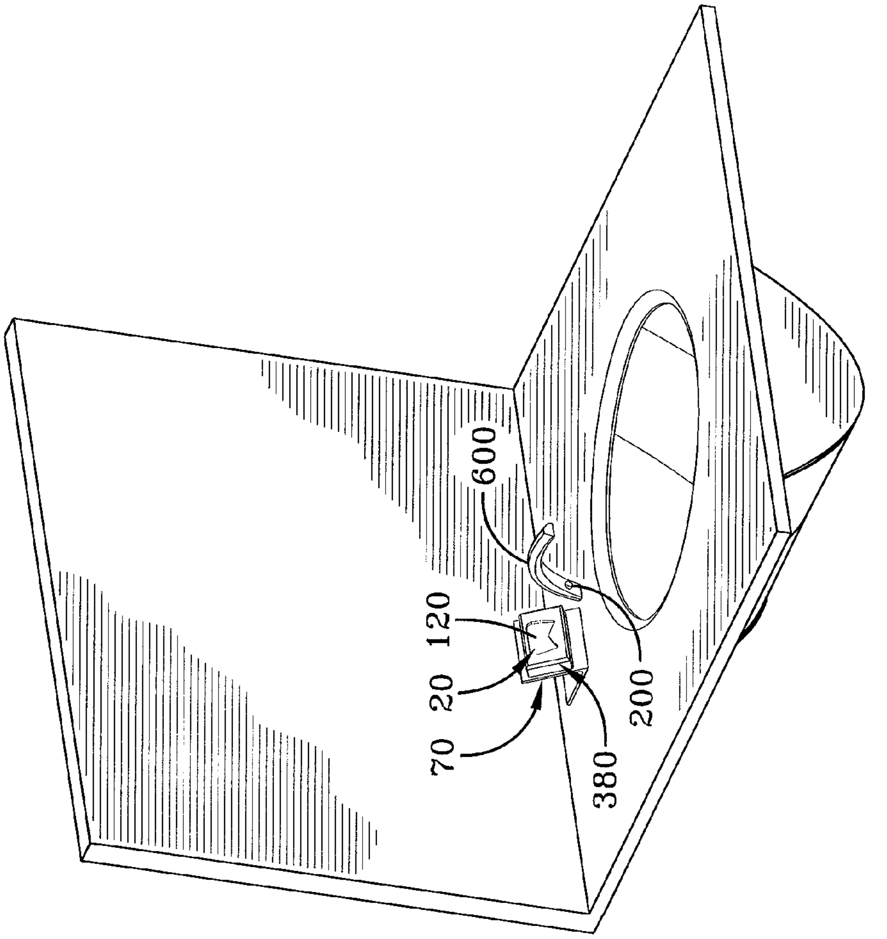
FIG. 7 is a perspective view of the system for selectively revealing indicia when configured as a stand-alone device to provide a remotely-located, hands-free actuator, such as in a faucet, in accordance with the concepts of the present invention.

In addition, the system 10 may be configured whereby the actuator 200 is maintained separately from the housing 70 and is remotely wired to the controller 100 of the stand-alone unit 380. For example, the actuator 200 may comprise a proximity sensor that is remotely maintained in a fixture 600, such as a faucet, as shown in FIG. 7, although the proximity sensor 200 may be maintained in any suitable fixture, structure, or surface. Thus, when an individual comes within the proximity of the fixture 600, the transitioning window 20 is transitioned to a substantially transparent state, so as to display the indicia 60. Such a configuration allows the transitioning window 20 to be placed in one area, while the triggering action used to control the transitioning window 20 is sensed by the actuator 200 in another area. In another aspect, the system 10 can be configured to be retrofit with existing detection sensors, such as proximity sensors, that are maintained by an existing device. For example, in the case of hands-free devices, such as hands-free faucets, the proximity sensor 200 may already be incorporated therein. As such, a user desiring to initiate or trigger the operation of the transitioning window 20 from the detection of a person's hands may couple the controller 100 to the proximity sensor 200 maintained by the faucet or other fixture 600 using any suitable communication interface.

Figure 8:
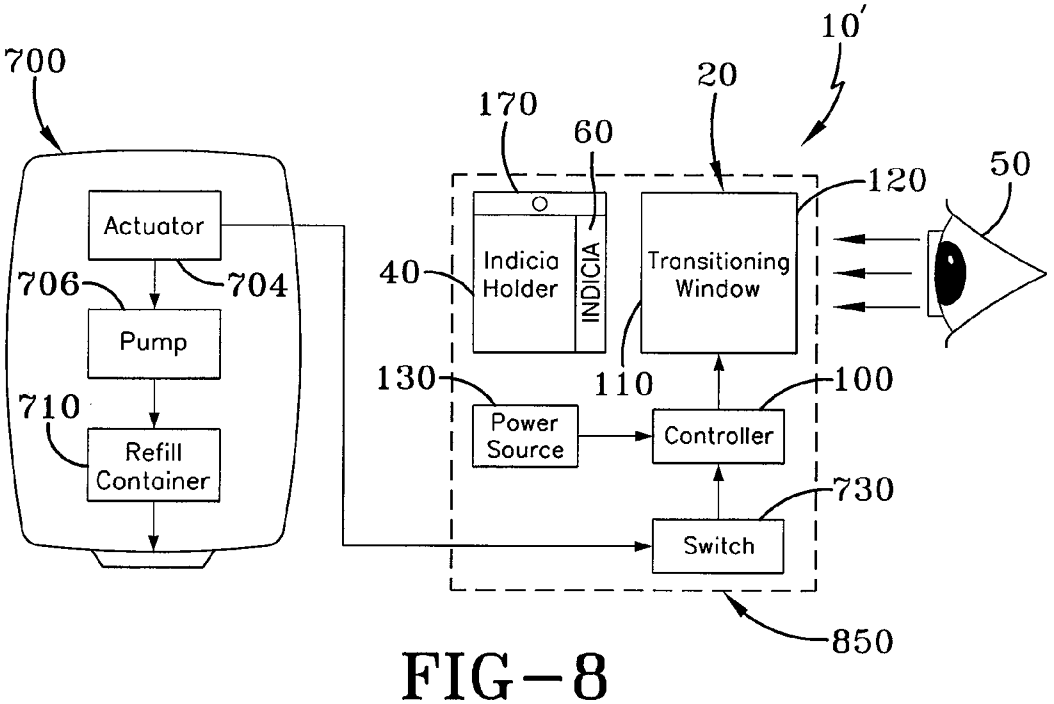
FIG. 8 is a block diagram of an alternative embodiment of the system for selectively revealing indicia in accordance with the concepts of the present invention.

In another embodiment, the system for selectively revealing indicia referred to by the reference numeral 10', may be retrofit with an existing dispenser 700, as shown in FIG. 8 of the drawings. Specifically, the dispenser 700 includes an actuator 704 that is operatively coupled to a pump 706. Thus, when the actuator 704 is physically engaged by a user, the pump 706 is actuated, so as to dispense an amount of material from a refill container 710 that is fluidly coupled thereto. It should be appreciated that the refill container 710 may include any suitable material, such as soap, sanitizer, moisturizer, or the like. The system 10' includes the transitioning window 20 that is in optical alignment with the indicia 60 maintained by the indicia holder 40 as previously discussed. The controller 100 is powered by the power source 130, which generally comprises any suitable battery, or any other suitable source of power, including solar power and A.C. (alternating current) mains power. In order to initiate the operation of the transitioning window 20, a switch 730 is provided in mechanical communication with the actuator 704. As such, when actuator 704 is engaged, the switch 730 is toggled, thereby commanding the controller 100 to toggle the transitioning window 20 from an at least partially opaque state to an at least partially transparent state and vice versa in the manner previously discussed with regard to FIGS. 1-7. It should be appreciated that the system 10' can be readily retrofit with an exiting dispenser 700 as discussed in detail below.

Figure 9:
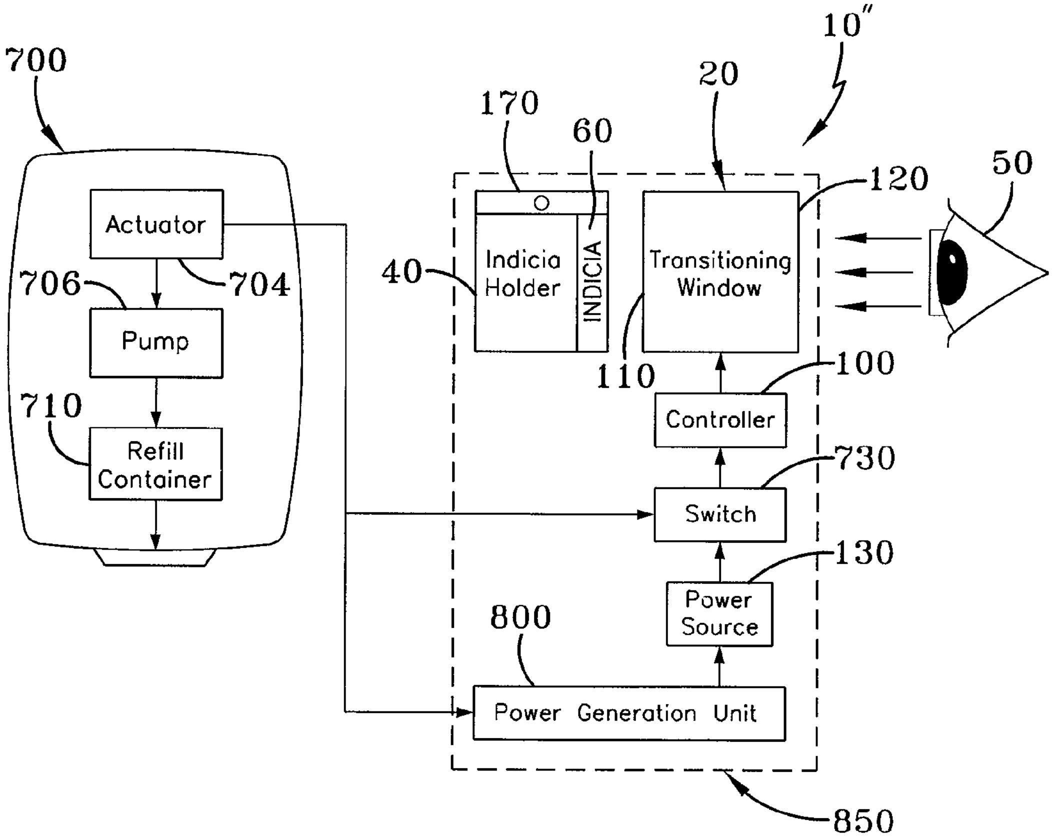
FIG. 9 is a block diagram of another alternative embodiment of the system for selectively revealing indicia shown in FIG. 8 in accordance with the concepts of the present invention.

In yet another embodiment, the system for selectively revealing indicia referred to by the reference numeral 10" may be retrofit with the dispenser 700 and enabled to function utilizing the power generated from the actuation of the actuator 704, as shown in FIG. 9 of the drawings. As such, the system 10" includes a power generation unit 800 that is in mechanical communication with the actuator 704, such that when the actuator 704 is engaged by an individual, the mechanical force imparted thereto is converted into electrical power that is supplied to the power source 130, which comprises a rechargeable battery, super capacitor or the like. In one aspect, the mechanical power generation unit 800 may comprise the power generating mechanism disclosed in U.S. patent application Ser. No. 11/999,538 entitled "Dispensing System with Magnet and Coil for Power Generation," which is jointly owned with the present application and incorporated herein by reference. For example, the power generation unit 800 may comprise a coil and a magnet that move relative to one another when the actuator 704 is engaged, resulting in the generation of power that is used to charge the power source 130. In order to control the supply of power to the transitioning window 20, the actuator 704 is also in mechanical communication with the switch 730, such that when the actuator 704 is engaged, the switch 730 is toggled, so that power from the power source 130 is delivered to the transitioning window 20, whereupon it transitions from an at least partially opaque state to an at least partially transparent state, allowing the indicia 60 to be viewed by the user. Simultaneously with the engagement of the actuator 704, the pump 706 is activated, so as to dispense material from the refill container 710.

Figure 10:
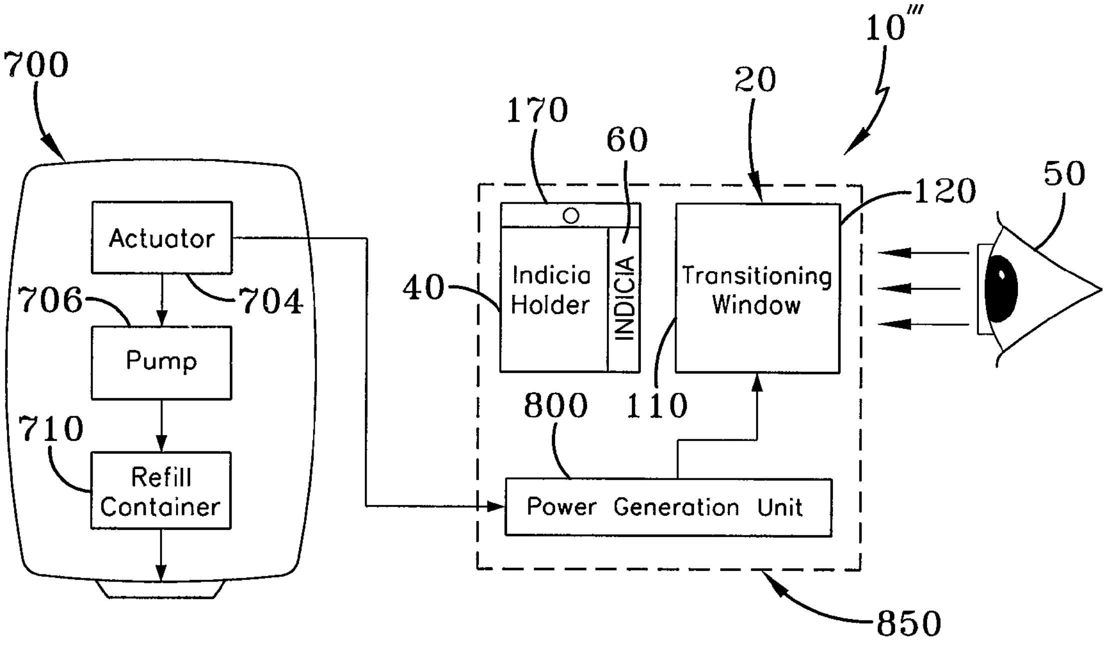
FIG. 10 is a block diagram of another alternative embodiment of the system for selectively revealing indicia shown in FIG. 8 in accordance with the concepts of the present invention.

In yet another embodiment, the system for selectively revealing indicia referred to by reference numeral 10'" may be configured without the power source 130 and switch 730, as shown in FIG. 10 of the drawings. As such, the actuator 704 is in operative communication with the power generation unit 800, whereby when the actuator 704 is engaged, the power generation unit 800 generates and delivers electrical power to the transitioning window 20, causing it to momentarily transition from an opaque or at least partially opaque state to a transparent or an at least partially transparent state. Because the power source 130 is not utilized, the system 10'" does not require the replacement of batteries and does not need to be restricted to those areas where an electrical outlet is available.

The system for selectively revealing indicia 10', 10", and 10'", as previously discussed, may be incorporated as part of a transitioning assembly 850, as shown in FIGS. 11-19, which facilitates the retrofit of existing dispensers 700 with the functionality of the transitioning window 20. Specifically, the transitioning assembly 850 comprises a housing 852 that includes a pair of locking attachment tabs 856 that extend from the bottom thereof. The housing 852 also includes a viewing aperture 860 which is disposed opposite a door 862 that is pivotably attached to the housing 852, such that when the pivoting door 862 is closed, the door 862 is separated from the viewing aperture 860 by a wall 864 that bounds the perimeter of the viewing aperture 860, forming an interior region 866 within the housing 852. In one aspect, the door 862 maintains a pair of snap tabs 868 that are pivotably retained by corresponding arms 870 provided by the housing 852, so as to allow the door 862 to pivot.

Disposed within the interior region 866 of the housing 852 is the transitioning window 20 that is positioned such that the viewing surface 120 is positioned adjacent to the viewing aperture 860 and such that the receiving surface 110 is adjacent to the door 862. To retain the transitioning window 20 in place, a bezel 872 is attached within the housing 852, adjacent to the receiving surface 110. Specifically, the bezel 872 and housing 852 include respective mounting apertures 873 and 874 that are configured to receive a suitable fastener 875, such as a screw, therethrough, to retain the bezel 872 in place. Alternatively, the bezel 872 may be attached to the housing 852 using any suitable means of fixation, such as adhesive or rivets for example.

Attached to the transitioning window 20 and disposed within the interior region 866 of the housing 852 is the controller 100 and power source 130. It should be appreciated that the power source 130 may comprise button cell-type batteries, small form factor batteries, or any other suitable power storage device. In one aspect, the controller 100 and power source 130 may be carried within an enclosure 880 that includes an enclosure cover 882 thereupon to separate them from the interior region 866 of the housing 852.

The door 862 maintains an inner surface 890 that is opposite an outer surface 892, which is bounded by opposed lateral sides 894 and 896, each of which includes a retention channel 900 that forms the indicia holder 40. The retention channels 900 are comprised of offset members 902 that extend from the inner surface 890 of the door 862 at a substantially right angle. Extending from the offset members 902 at a substantially right angle, so as to be substantially parallel with the inner surface 890 of the door 862, are retention arms 904 that are configured to retain the indicia 60 adjacent to the door 862. It should also be appreciated that in order to facilitate the opening and closing of the door 862, a handle may also be disposed on the outer surface 868 of the door 862.

Figure 11:
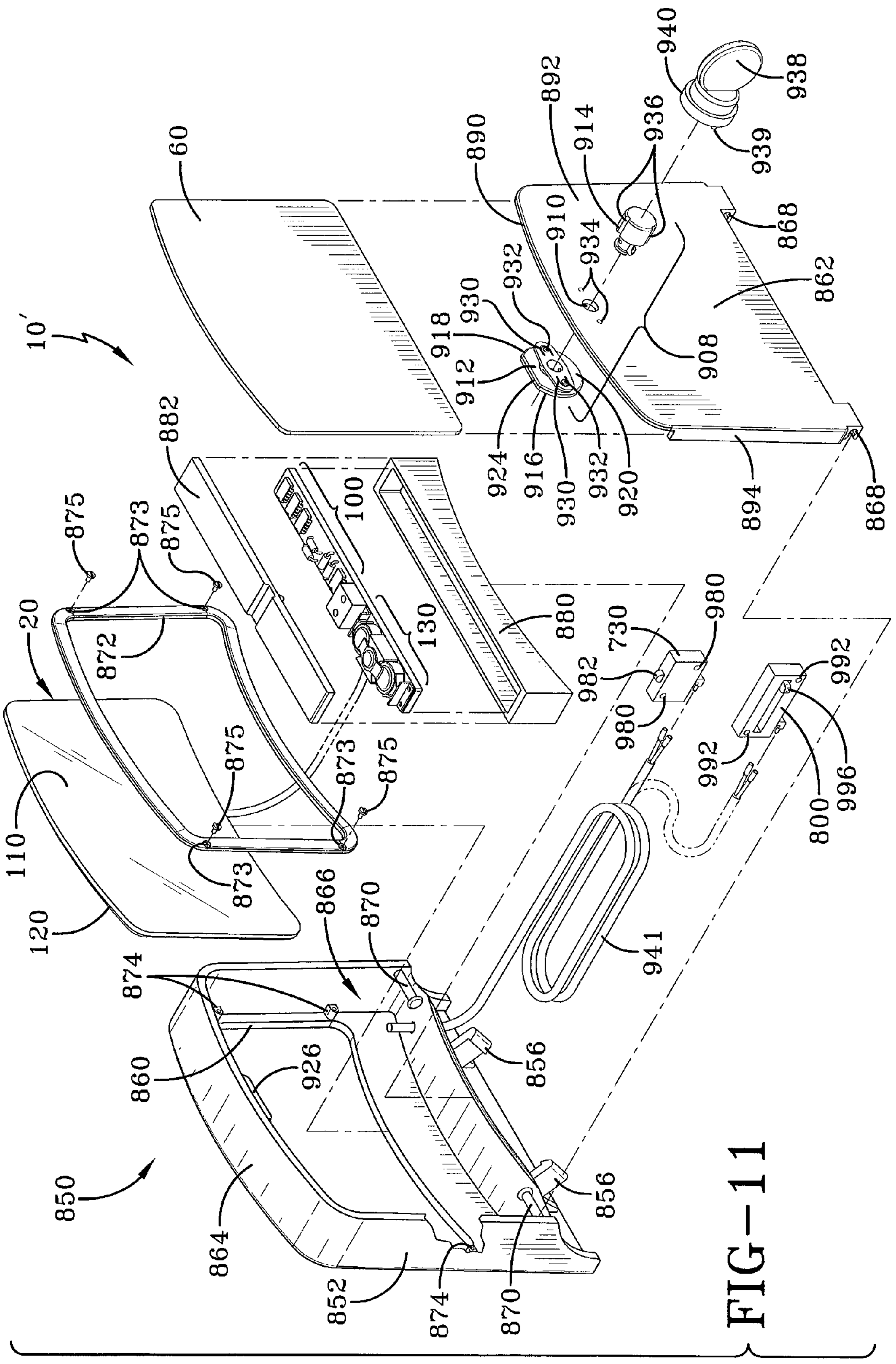
FIG. 11 is an exploded perspective view of a transitioning assembly that provides a housing to maintain the system for selectively revealing indicia in accordance with the concepts of the present invention.
Figure 12:
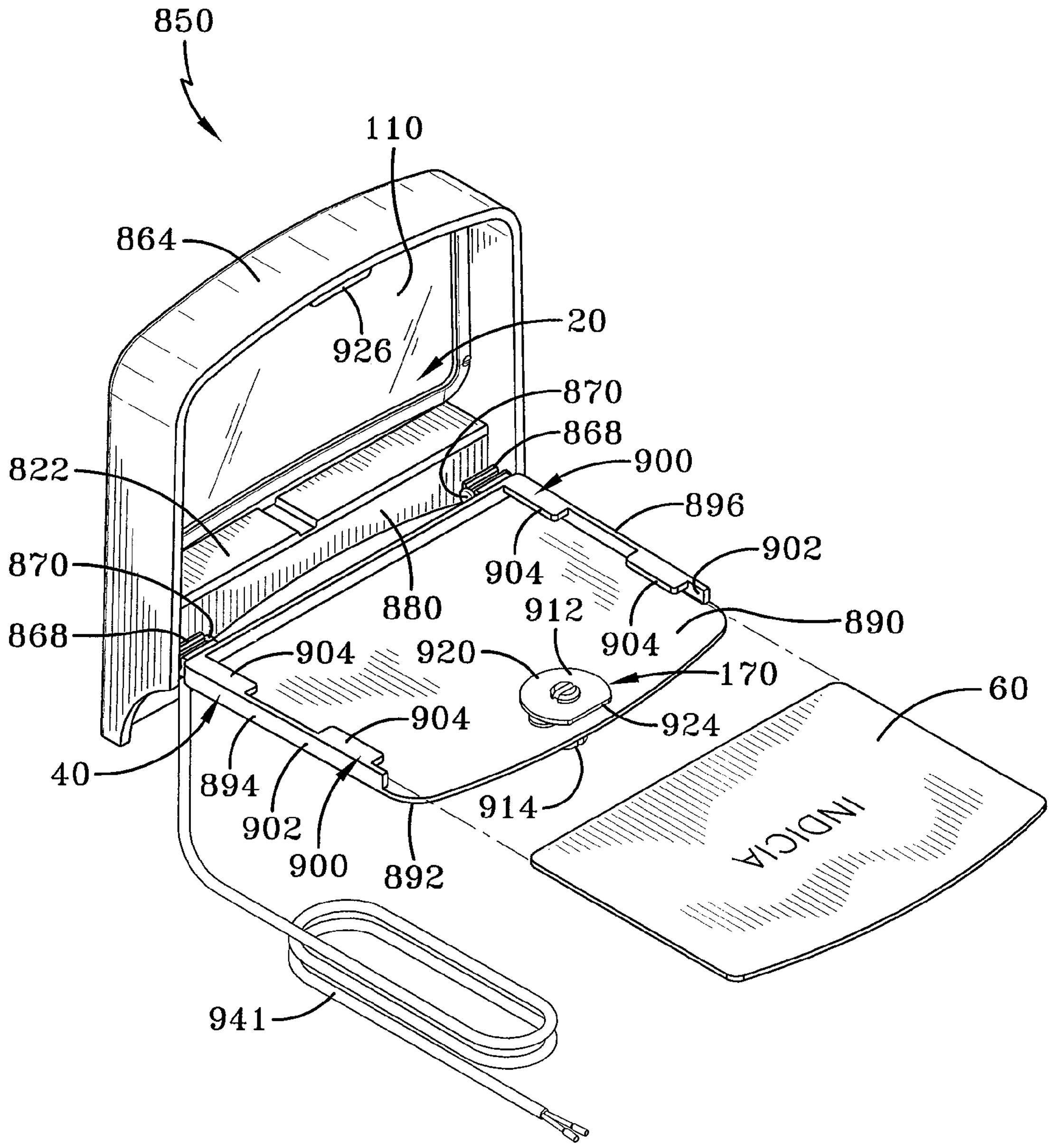
FIG. 12 is a perspective view of the transitioning assembly with a pivoting door in an open position in accordance with the concepts of the present invention.
Figure 13:
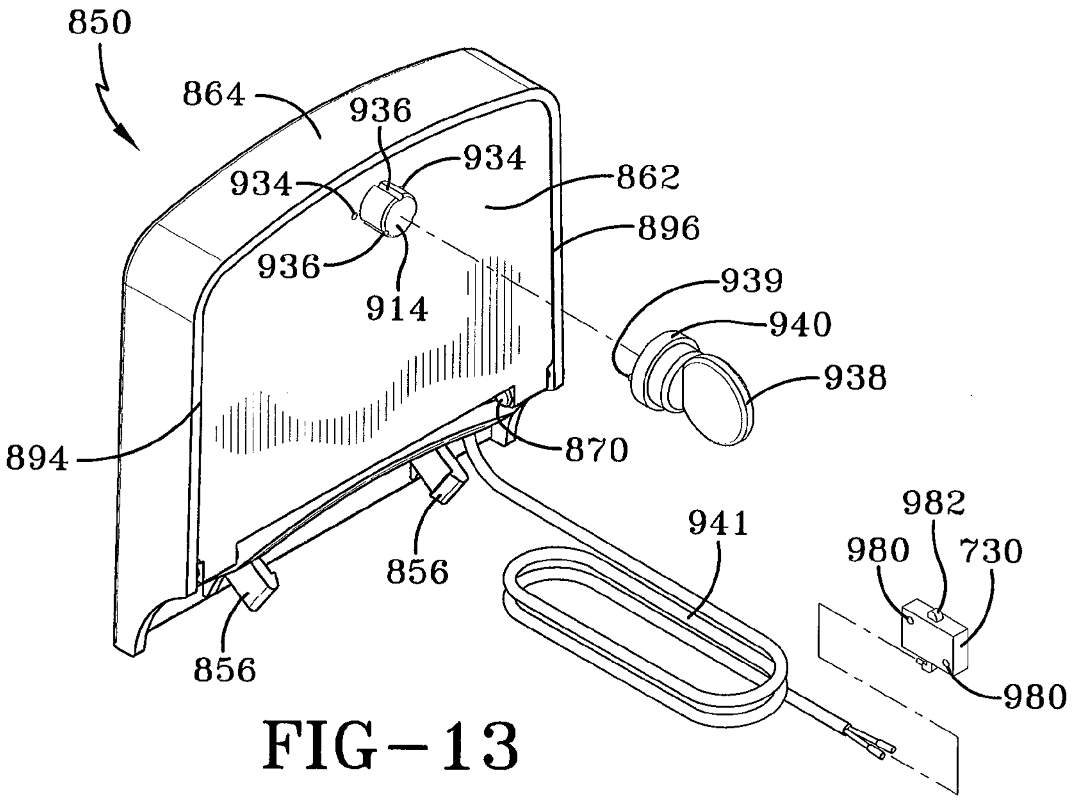
FIG. 13 is a perspective view of the rear of the transitioning assembly showing the door in a closed position in accordance with the concepts of the present invention.
Figure 14:
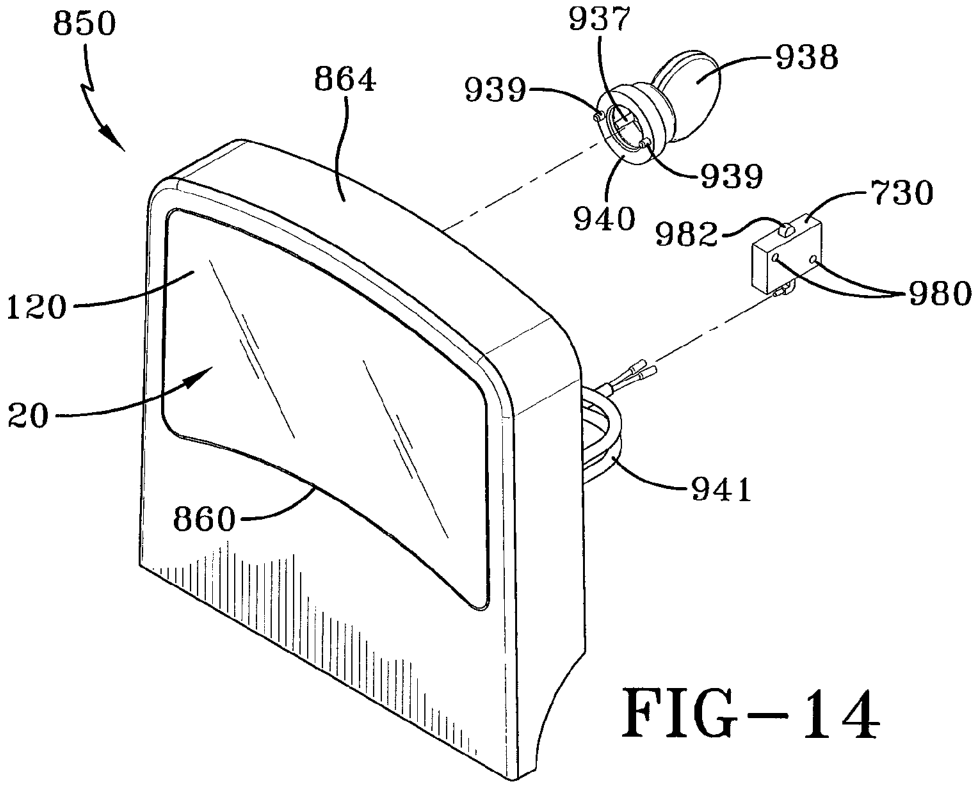
FIG. 14 is a perspective view of the front of the transitioning assembly in accordance with the concepts of the present invention.
Figure 15:
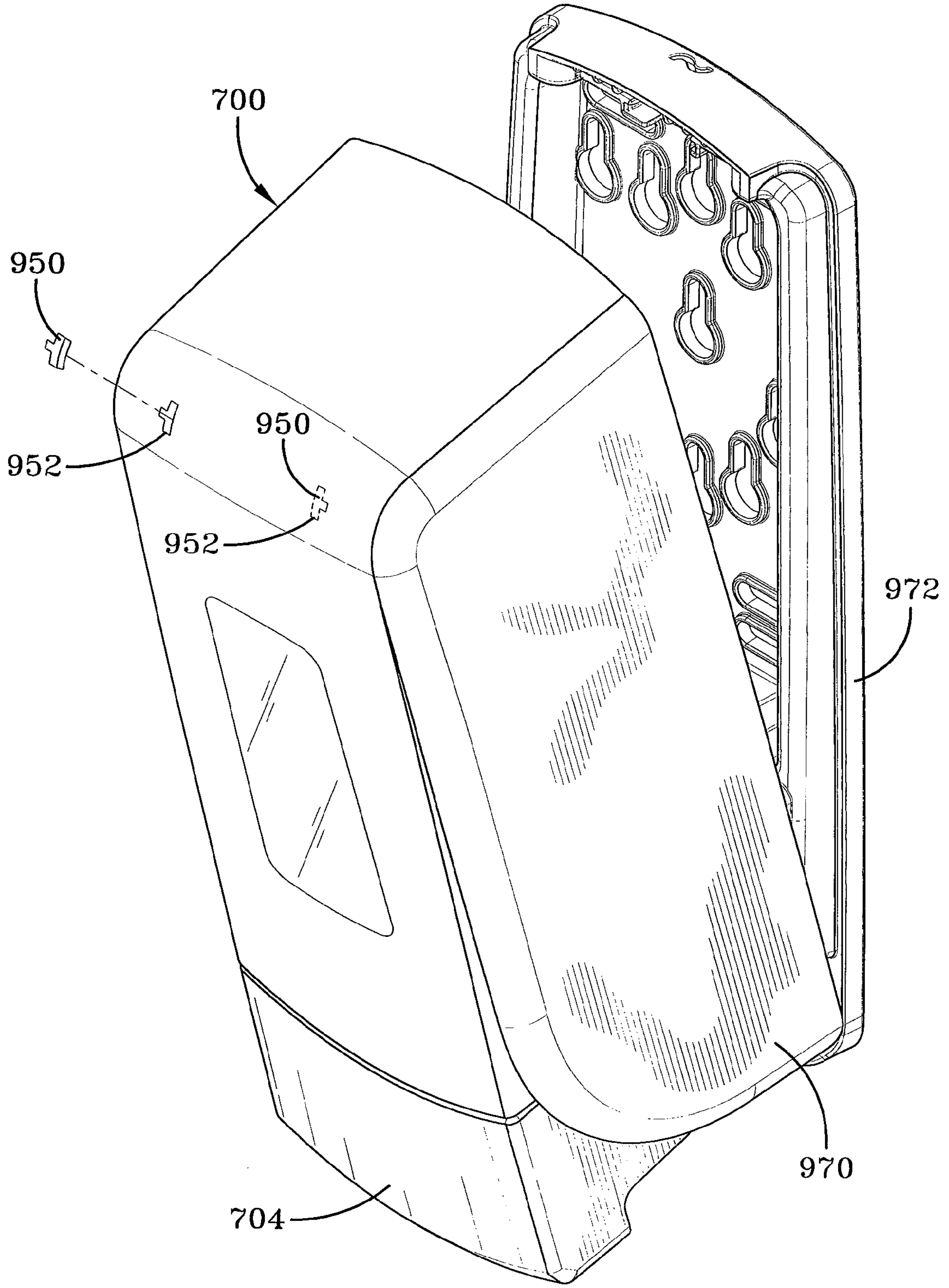
FIG. 15 is a perspective view of a dispenser to which the transitioning assembly is retrofit in accordance with the concepts of the present invention.

The door 862 also includes the locking device 170, which comprises a lock assembly 908, as shown clearly in FIG. 11. The lock assembly 908 is operably attached to a lock aperture 910 provided by the door 862, which allows a lock tab 912 that is coupled to a lock knob 914 using any suitable means of fixation, such as adhesive or snap fit, to rotate therewithin. The lock tab 912 comprises an outer surface 916 that is opposite an inner surface 918, which is bounded by an arcuate lock section 920 and a substantially flat unlock section 924 that are configured to respectively engage and disengage from a lock member or tab 926 that extends from the housing 852. Disposed on the inner surface 918 of the lock tab 912 are compression tabs 930 that maintain compression protrusions 932 that are compressively biased toward the inner surface 890 of the door 862, such that the compression protrusions 932 extend into the corresponding stop apertures 934 that extend through the door 862. Thus, when the compression protrusions 932 of the compression tabs 930 are received within the stop apertures 934, the lock knob 914 cannot be rotated. The lock knob 914 includes key channels 936 that are configured to receive complementary receivers 937 that are maintained by a key 938 when the lock knob 914 is received by the key 938. The key 938 also includes key protrusions 939 that are disposed on a ring 940 that freely rotates upon the key 938. The key protrusions 939 are configured to be received within the stop apertures 934 in the door 862 and extend therethrough to bias the compression protrusions 932 out of the stop apertures 934 when the key 938 is operatively coupled to the lock knob 914, allowing the knob 914 to rotate the lock tab 912 to either a locked or unlocked state.

As such, when it is desired to lock the door 862 in a closed position adjacent to the housing 852, the key 938 is inserted onto the lock knob 914, such that the key protrusions 939 of the ring 940 are received within the stop apertures 934 of the door 862. The key protrusions 939 extend through the stop apertures 934 to engage and bias the compression protrusions 932 of the compression tabs 930 out of the stop apertures 934 and away from the inner surface of door 862, allowing the lock tab 912 to be rotated by the turning of the key 938, so that the lock section 920 is adjacent to the lock member 926 to lock the door 862 to the housing 852. Similarly, when it is desired to unlock the door 862, the key 938 is inserted onto the key knob 914, such that the key protrusions 939 are received within the stop apertures 934 of the door 862. The key protrusions 939 extend through the stop apertures 934 to engage and bias the compression protrusions 932 of the compression tabs 930 out of the stop apertures 934 and away from the inner surface of the door 862, thereby allowing the lock tab 912 to be rotated, so that the unlock section 924 is adjacent to the lock member 926, allowing the door 862 to be opened. It should be appreciated that in either case, when the lock knob 914 is rotated to lock or unlock the door 862, once rotation of the knob 914 is completed, the protrusions 932 are received within the stop apertures 934, thus preventing the knob 914 from being freely turned. Thus, the use of the lock assembly 908 limits access to the indicia 60 to only authorized personnel that are in possession of the key 938, thereby preventing unwanted tampering with the indicia 60.

In order to control the switching of the transitioning window 20, a control wire 941 is provided, such that one end is received through a wire aperture 942 within the wall 864 of the housing 852 and coupled to the controller 100, while another end of the control wire 941 is coupled to the actuation switch 730. Alternatively, the control wire 941 may also be configured to transfer power generated by the power generation unit 800 to the controller 100.

As such, the transitioning assembly 850, which is configured to include either of the systems for selectively revealing indicia 10', 10'', and 10''', allows the dispenser 700 to be subsequently retrofit with the functionality to selectively reveal indicia that is provided by the transitioning assembly 850.

Continuing with reference to FIGS. 15-19, other features of the transitioning assembly 850 to facilitate the retrofit of the transitioning assembly 850 to the dispenser 700 will be discussed. In particular, the dispenser 700 includes a dispenser cover 970 that pivots from a mounting plate 972 that is suitable for attachment to a wall or other structure. In addition, the dispenser cover 970 includes knockout sections 950 that are removable therefrom to reveal attachment apertures 952 that are configured to receive corresponding attachment tabs 856 provided by the transitioning assembly 850.

Figure 16:
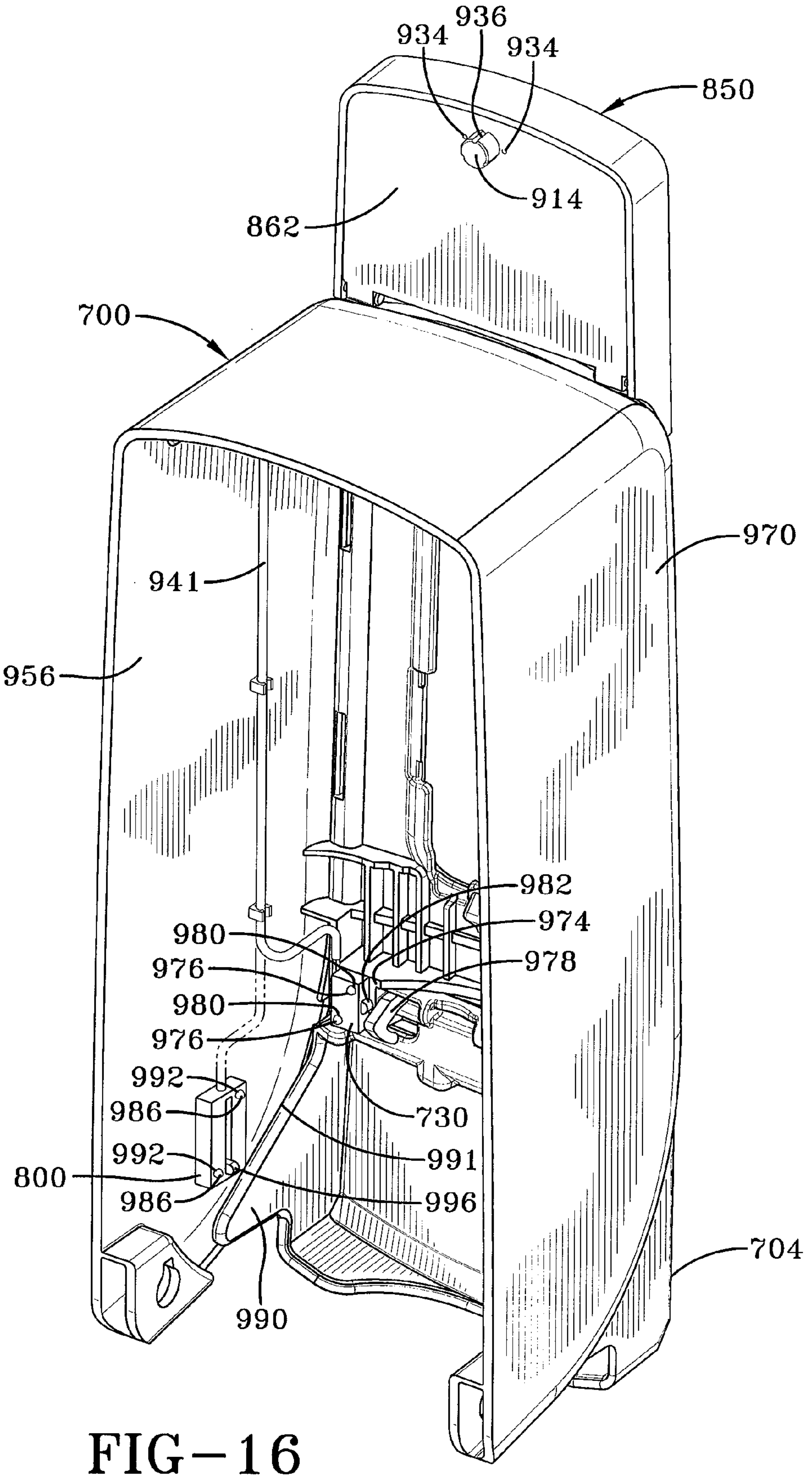
FIG. 16 is a perspective view of the rear of the dispenser showing the attachment of a switch and a power generation unit thereto in accordance with the concepts of the present invention.
Figure 17:
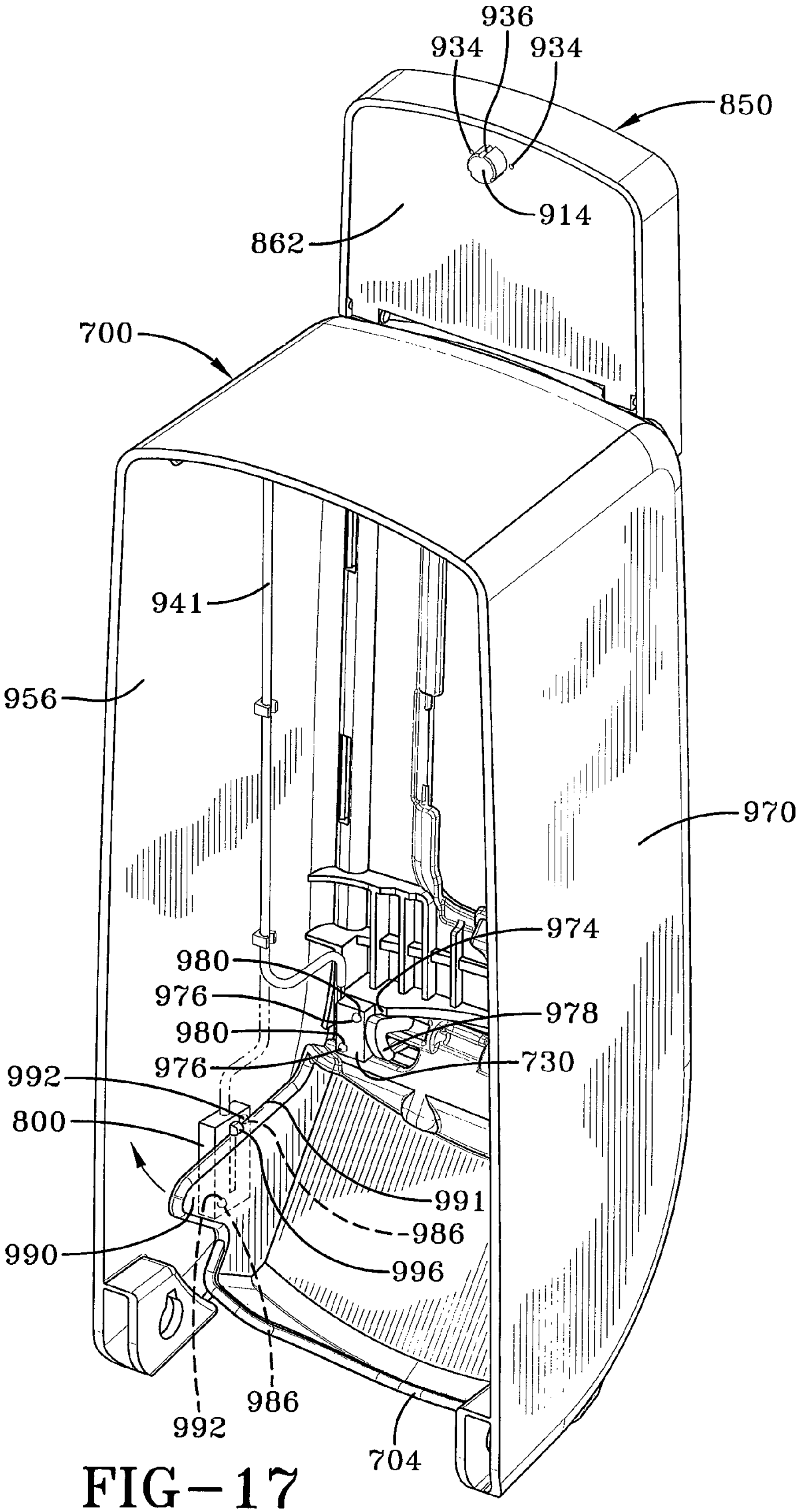
FIG. 17 is another perspective view of the rear of the dispenser showing a switching arm in operative communication with the switch and an engagement arm in operative communication with the power generation unit in accordance with the concepts of the present invention.
Figure 18:
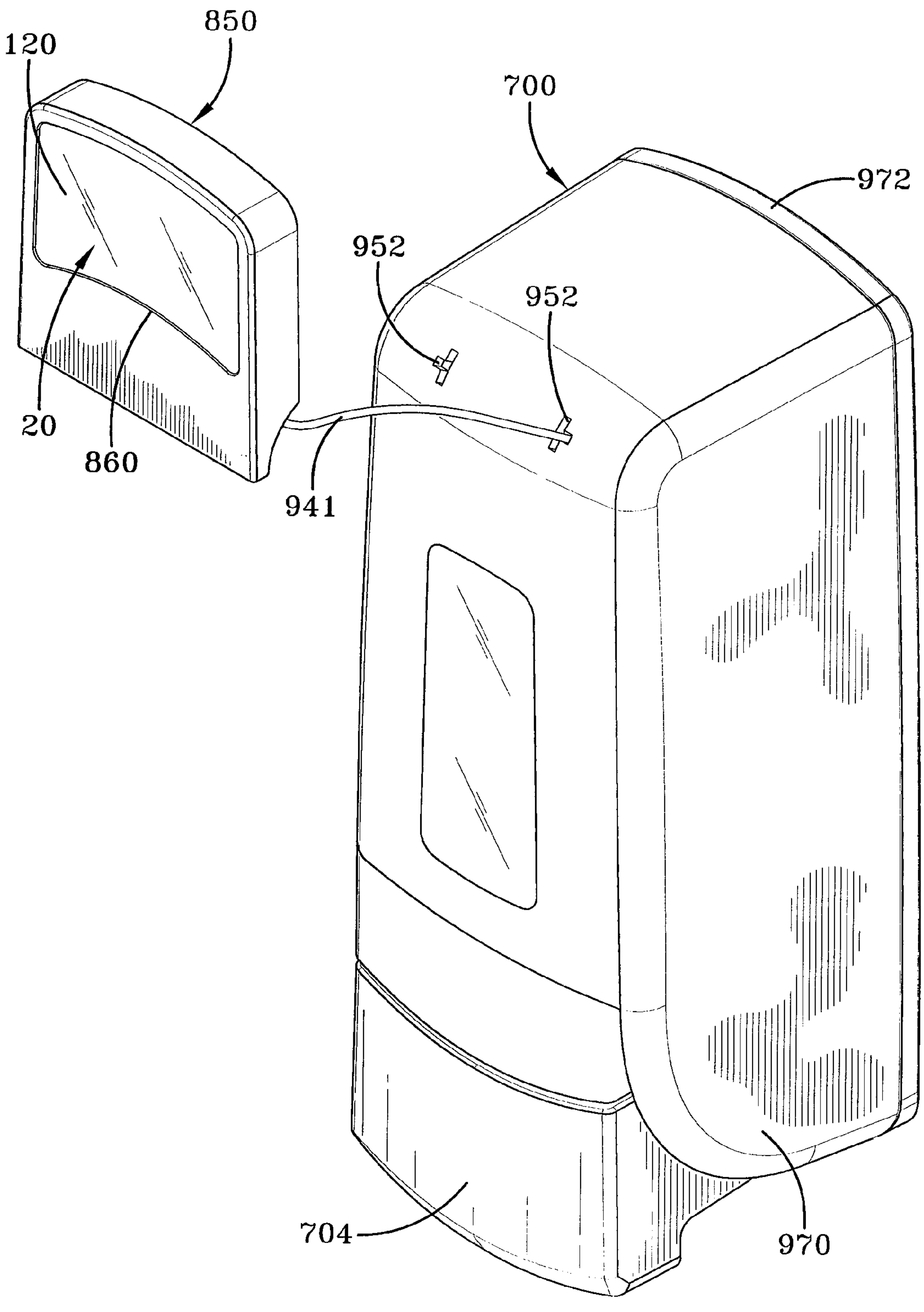
FIG. 18 is a perspective view of the front of the dispenser showing the attachment of the transitioning assembly to the dispenser in accordance with the concepts of the present invention.

The actuation switch 730 of the transitioning assembly 850 is configured, so that it can be readily attached to a mounting surface 974 within the dispenser 700. For example, as shown in FIGS. 16 and 17, the dispenser 700 includes retaining tabs 976 formed on the mounting surface 974 of the dispenser 700 that is in a region proximate to a switching arm 978 that is attached to the actuator 704. The retaining tabs 976 are configured to be received by retaining apertures 980 maintained by the switch 730, allowing the switch 730 to remain in operable communication with the switching arm 978. It should be appreciated that the retaining tabs 976 and retaining apertures 980 are configured as a snap-fit or compression-fit system, although adhesive tape or any other suitable means of fixation may be used. As such, this facilitates the installation or retrofitting process of the switch 730 to the dispenser 700 when installed by individuals with limited mechanical skills. Thus, when the actuator 704 is engaged, and pushed, the switching arm 978 engages a switch tab 982 provided by the switch 730, so as to initiate the operation of the transitioning window 20 and/or the dispensing functions of the dispenser 700.

Alternatively, in embodiments where the power generation unit 800 is used, a set of retaining tabs 986 also extend from an inner wall surface 988 of the dispenser cover 970 at a region proximate to an engagement arm 990 having a tapered edge 991 that extends from the actuator 704. The retaining tabs 986 are configured to be received by retaining apertures 992 provided by the power generation unit 800, so that the power generation unit 800 is retained adjacent to the inner surface 956 of the dispenser. As such, when the actuator 704 is engaged, or pushed, the tapered edge 991 of the engagement arm 990 moves a slide arm 996 of the power generation unit 800 upward. And when the actuator 704 is released, the slide arm 996 is permitted to move downward. In one aspect, the slide arm 996 may be attached to a magnet (not shown) that is moved within a wire coil (not shown), so as to generate electrical power that is supplied to the transitioning assembly 850 via the control wire 941. That is, the upward and downward movement of the magnet within the wire coil initiated by the engagement arm 990 enables the generation of electrical power that is utilized by the transitioning assembly 850.

Thus, to install or retrofit the transitioning assembly 850 to the dispenser 700, the knockouts 950 are removed from the dispenser cover 792, and the control wire 941 is inserted through one of the exposed attachment apertures 952. Next, the attachment tabs 856 are placed within the attachment apertures 952 of the dispenser cover 792, so that the transitioning assembly 850 is retained thereto. The switch 730 and the power generation unit 800 are coupled to the control wire 941 using suitable connectors and attached within the dispenser 700 upon the inner surface 956 using respective retaining tabs 976 and 986 and respective retaining apertures 980 and 992 previously discussed.

Thus, the transitioning assembly 850 is configured, so that it can be retrofit to an existing dispenser 700 in a user-friendly manner without the use of tools; however, it should be appreciated that the transitioning assembly 850 may be made integral with the dispenser 700 if desired. Furthermore, the transitioning assembly 850 allows users to selectively add the functionality of the transitioning window 20 at only those particular dispensers 700 where it is desired. Additionally, the use of the power generation unit 800 allows the transitioning assembly 850 to operate in a self-sufficient manner, so that it can be utilized in locations where external mains power or other external power sources are unavailable.

It will, therefore, be appreciated that one advantage of one or more embodiments of the present invention is that a transitioning assembly provides a locking device that restricts unauthorized individuals from accessing the transitioning assembly. Still another advantage of the present invention is that a transitioning assembly provides a power generation unit that can be mounted in any desired area without concern for the availability of external power sources. Yet another advantage of the present invention is that a transitioning assembly having a transitioning window that selectively reveals indicia to an observer can be readily retrofit to an existing dispenser in a user-friendly manner.

Although the present invention has been described in considerable detail with reference to certain embodiments, other embodiments are possible. Therefore, the spirit and scope of the appended claims should not be limited to the description of the embodiments contained herein.

What is claimed is:

1. A dispenser to selectively reveal indicia to an observer comprising:

an actuator operatively engaged to a power generation unit that generates electrical power from the movement of said actuator;

a transitioning window coupled to said power generation unit having a receiving surface and a viewing surface, said window configured to transition between an at least partially opaque state and an at least partially transparent state; and an indicia holder configured to retain the indicia in optical communication with said receiving surface;

wherein upon the actuation of said actuator, said power generation unit energizes said transitioning window to transition from said at least partially opaque state to said at least partially transparent state to permit the observer to view the indicia via said viewing surface.

2. The dispenser of claim 1, further comprising a refill container maintaining an amount of material, said refill container in operative communication with said actuator, wherein when said actuator is actuated, said material is dispensed therefrom.

3. The dispenser of claim 1, wherein said power generation unit comprises a metal coil and a magnet that are moved relative to one another when said actuator is engaged.

4. A dispenser to selectively reveal indicia to an observer comprising:

an actuator in operative communication with a power generation unit that generates electrical power from the movement of said actuator;

a transitioning window having a receiving surface and a viewing surface, said window configured to transition between an at least partially transparent state and an at least partially opaque state;

a switch coupled to said transitioning window and in operative engagement with said actuator;

a portable power source coupled between said power generation unit and said switch; and an indicia holder configured to retain the indicia in optical communication with said receiving surface;

wherein upon the actuation of said actuator, said power generation unit charges said portable power source, and toggles said switch from an off state to an on state, such that said portable power source energizes said transitioning window to transition from said at least partially opaque state to said at least partially transparent state to permit the observer to view the indicia via said viewing surface.

5. The dispenser of claim 4, further comprising a refill container maintaining an amount of material, said refill container in operative communication with said actuator, wherein when said actuator is actuated, said material is dispensed therefrom.

6. The dispenser of claim 4, wherein said power generation unit comprises a metal coil and a magnet that are moved relative to one another when said actuator is engaged.

7. The dispenser of claim 4, wherein said portable power source comprises a battery.

8. The dispenser of claim 4, wherein said portable power source comprises a capacitor.

9. The dispenser of claim 4, wherein said actuator includes an engagement arm and a switching arm, such that said engagement aim is in operative communication with said power generation unit and said switching arm is in operative engagement with said switch.

10. A system for selectively revealing indicia to an observer, the system adapted to be attached to a dispenser with at least one attachment aperture, the system comprising:

a housing that includes a transitioning window having a receiving surface opposite a viewing surface, said transitioning window configured to transition between an at least partially transparent state and an at least partially opaque state, said housing maintaining at least one mounting tab receivable within the at least one attachment aperture;

a controller coupled to said transitioning window;

a switch coupled to said controller, said switch adapted to be attached to the dispenser, so as to be engaged by an actuator; and a pivoting door attached to said housing, said pivoting door maintaining an indicia holder to retain the indicia therein, such that when said pivoting door is closed, the indicia is adjacent to said receiving surface;

wherein upon the actuation of said actuator, said switch is toggled from an off state to an on state to transition said transitioning window from said at least partially opaque state to said at least partially transparent state to permit an observer to view the indicia via said viewing surface.

11. The system of claim 10, wherein said indicia holder comprises opposed retention channels.

12. The system of claim 10, further comprising a power generation unit coupled to said controller, said power generation unit adapted to be attached to the dispenser, so as to be engaged by said actuator, such that upon actuation of said actuator, said power generation unit charges a portable power source used to supply power to said transitioning window when in said on state.

13. The dispenser of claim 12, wherein said power generation unit comprises a metal coil and a magnet that are moved relative to one another when said actuator is engaged.

14. The system of claim 10, wherein said actuator includes a switching arm that is in operative engagement with said switch.

15. The system of claim 12, wherein said actuator includes an engagement arm that is in operative engagement with said power generation unit.

16. The system of claim 10, wherein said door includes a locking device that selectively locks said door to said housing.

17. A system for selectively revealing indicia to an observer, the system configured to be attached to a dispenser having at least one attachment aperture, the system comprising:

a housing that includes a transitioning window having a receiving surface opposite a viewing surface, said transitioning window configured to transition between an at least partially transparent state and an at least partially opaque state, said housing maintaining at least one attachment tab receivable within the at least one attachment aperture;

a power generation unit coupled to said transitioning window, said power generation unit adapted to be attached to the dispenser, so as to be engaged by an actuator; and a pivoting door attached to said housing, said pivoting door maintaining an indicia holder to retain the indicia therein, such that when said pivoting door is closed the indicia is adjacent to said receiving surface;

wherein upon the actuation of said actuator, said power generation unit supplies power to said transitioning window to toggle it from the at least partially opaque state to the at least partially transparent state to permit an observer to view the indicia via said viewing surface.

18. The system of claim 17, wherein said indicia holder comprises opposed retention channels.

19. The system of claim 17, wherein said door includes a locking device to selectively lock said door to said housing.

20. The system of claim 17, wherein said actuator includes an engagement arm that is in operative communication with said power generation unit.

* * * * *